(12) United States Patent
Nishi et al.

(10) Patent No.: US 7,466,857 B2
(45) Date of Patent: Dec. 16, 2008

(54) CONVERSION CORRECTING METHOD OF COLOR IMAGE DATA AND PHOTOGRAPHIC PROCESSING APPARATUS IMPLEMENTING THE METHOD

(75) Inventors: Noriyuki Nishi, Wakayama (JP); Koji Kita, Wakayama (JP)

(73) Assignee: Noritsu Koki Co., Ltd., Wakayama-Ken (JP)

(*) Notice: Subject to any disclaimer, the term of this patent is extended or adjusted under 35 U.S.C. 154(b) by 903 days.

(21) Appl. No.: 10/687,727

(22) Filed: Oct. 16, 2003

(65) Prior Publication Data

US 2004/0119995 A1 Jun. 24, 2004

(30) Foreign Application Priority Data

Oct. 17, 2002 (JP) ............................ 2002-302751
Dec. 20, 2002 (JP) ............................ 2002-369674

(51) Int. Cl.
*G06K 9/00* (2006.01)

(52) U.S. Cl. .................. 382/167; 348/645; 358/1.9; 358/518; 358/520

(58) Field of Classification Search .................. 358/80, 358/516, 518, 645; 382/167
See application file for complete search history.

(56) References Cited

U.S. PATENT DOCUMENTS 5,187,570 A * 2/1993 Hibi et al. .................. 358/520

(Continued)

FOREIGN PATENT DOCUMENTS

EA 0 563 877 A2 10/1993

(Continued)

OTHER PUBLICATIONS

Haskell et al., "Simultaneous Color Clipping and Luminance Preserving for High Quality Entertainment Movie Coding," Advances in Multimedia Information Processing—PCM 2002. Third IEEE Pacific RIM Conference on Multimedia. Proceedings, vol. 2532, Dec. 16, 2002, pp. 361-368.

*Primary Examiner*—Samir A Ahmed
*Assistant Examiner*—Aklilu k Woldemariam
(74) *Attorney, Agent, or Firm*—Fulbright & Jaworski, LLP

(57) ABSTRACT

An image processing method for correcting pixel values of each pixel constituting color image data by shifting, in a coordinate system, a mathematical correction function defining correction values for input values. The method includes the computer-implemented steps of: (1) determining a maximum value and a minimum value among correction values of respective color components obtained for each pixel by using said correction function and then calculating differences between the respective correction values of the respective color components and said minimum value and calculating also a difference between said maximum value and the minimum value; (2) dividing the calculated differences between the respective correction values of the respective color components and the minimum value by the calculated difference between the maximum value and the minimum value, thereby to obtain color ratios for the respective color components; (3) judging, as an inappropriate pixel, any pixel having a correction value overflowing from a predetermined maximum output gradation value and setting the overflowing correction value to the predetermined maximum output gradation value and judging also, as an inappropriate pixel, any pixel having a correction value underflowing from a predetermined minimum output gradation value and setting the underflowing correction value to the predetermined minimum output gradation value; and (4) effecting color balance adjustment so as to cause the correction values of the inappropriate pixel to agree with said respective color ratio thereof.

10 Claims, 15 Drawing Sheets

123 reading control section
139 image memory
140 recording medium driving device
136 filter feeding control section
125 lamp control section
60 system controller
123 film transport control section 123 film transport control section
34 exposure control section
33 laser exposure section
70 operation section
80 display section
324 print paper transport control section
514 cutter control section

U.S. PATENT DOCUMENTS

| | | | | |
|---|---|---|---|---|
| 5,619,280 | A * | 4/1997 | Yamashita et al. | 348/645 |
| 5,949,556 | A * | 9/1999 | Tamai | 358/518 |
| 6,101,271 | A | 8/2000 | Yahashita et al. | |
| 6,571,010 | B1 * | 5/2003 | Inoue | 382/162 |
| 6,856,429 | B1 * | 2/2005 | Noguchi et al. | 358/1.9 |

FOREIGN PATENT DOCUMENTS

| | | |
|---|---|---|
| EA | 0 933 952 A2 | 8/1999 |
| JP | 08 317187 A | 11/1996 |
| JP | 11-331596 | 11/1999 |
| JP | 2002-044422 | 2/2002 |

* cited by examiner exposure density characteristics curve

CONVERSION CORRECTING METHOD OF COLOR IMAGE DATA AND PHOTOGRAPHIC PROCESSING APPARATUS IMPLEMENTING THE METHOD

BACKGROUND OF THE INVENTION

1. Field of the Invention

The present invention relates to a correction technique for use in conversion of color image data received from an input device into color image data adapted for an output device.

2. Description of the Related Art

In the field of photographic processing, in general, input color image data obtained by reading an image on a photographic film by e.g. a scanner has a greater gradation range (greater color depth) than output color image data (to be outputted for monitor display, printing etc.) For instance, 12-bit input color image data (hereinafter, referred to as "input image data" when appropriate) is generally subjected to a bit conversion into 8-bit output color image data (hereinafter, referred to as "output image data" when appropriate).

The greater gradation range of the input image data than the output image data is provided for the following reasons. Namely, the negative film is provided with a very wide density descriptive range and it is desired to render this wide range of density information of the negative film into data having maximum fidelity thereto. Conversely, the gradation range of the output image data is adapted to the color development characteristics of the print paper. And, the very wide density descriptive range of the negative film is provided for making an appropriate photography possible even with a simple inexpensive camera (e.g. one-use camera) without exposure adjustment function, thereby to facilitate photography by an unskilled or inexperienced amateur photographer.

Further, in case the bit conversion is effected for converting the input image data into the output image data, in order to allow the gradation change in the input image data to be reproduced as it is in the output image data, a mathematical function such as one shown in FIG. 4 is employed for directly converting the gradation in the distribution range of the input image data into the gradation of the output image data, thereby to effect conversion from the 12-bit data into 8-bit data.

On the other hand, by effecting various processing on the digital image data, it is possible to correct the density or color depth of an image to be reproduced from the output image data (see e.g. Japanese Patent Application "Kokai" No.: Hei. 11-331596 and Japanese Patent Application "Kokai" No.: 2002-44422). In this respect, there are a variety of techniques currently available for the density correction to be effected on the digital image data. One commonly employed method is shifting the position of the mathematical function (referred to as "correction function" hereinafter). For instance, if it is desired to obtain a greater density for an entire output image to be obtained from a correction function shown in FIG. 4, the density correction is made after shifting the correction function to the right as illustrated in FIG. 5. With this shifting of the function, output gradation to be obtained from each input gradation can be adjusted, so that output image data of a variety of densities can be obtained from a single input image data.

With the above-described density correction, however, as also illustrated in FIG. 5, within the possible distribution range of the input image data, it is possible that some input gradation values thereof may be converted into correction values which deviate from the possible range of the output gradation values. That is, in the correction function shown in FIG. 5, normal or appropriate values cannot be outputted from those input gradation values corresponding to the portions denoted with bold line segments. Namely, when the correction function is shifted as described above, the correction value cannot be outputted as it is as a gradation value if this correction value overflows from a maximum output gradation value or underflows from a minimum output gradation value.

Therefore, the digital image data cannot be obtained unless all correction values overflowing from the possible output gradation range are forcibly converted into the same maximum output gradation value (into 255 in the case of 8 bit data) and all correction values underflowing from the possible output gradation range are forcibly converted into the same minimum output gradation value (0) (this process will be referred to as "chopping" hereinafter). In this, in the conversion of the input image data into the output image data by suing the above-described correction function, if the chopping is effected for digital image data of at least one color component, the chopping may result in disturbance or loss of the original color balance among the output image data of the respective color components.

For example, let us now suppose that the above-described correction function is a linear function having a positive proportional constant and this function is used in bit conversion of one pixel data (one set of pixel color values) of 12-bit input image data: (B, G, R)=(200, 250, 300) into 8-bit output image data. This case will be described next.

(a) in case the position of the correction function is set to cause an input gradation value=200 to correspond to a maximum output gradation value=255:

With the above correction function, there are obtained correction values of: (b, g, r)=(255, 305, 355). In this, however, g=305 and r=355, respectively are out of the possible output range of gradation values. Hence, the above-described chopping is effected for g=305 and r=355, respectively. With this, the output gradation values of: (B, G, R)=(255, 255, 255) are eventually obtained. Accordingly, the original color balance is disturbed in the output image data.

(b) in case the position of the correction function is set so as to cause the input gradation value=250 to correspond to a maximum output gradation value=255:

With the above correction function, there are obtained correction values of: (b, g, r)=(205, 255, 300). In this, however, r=300 overflows from the possible output range of gradation values. Hence, the chopping is effected for this r=300. With this, the output gradation values of: (B, G, R)=(205, 255, 255) are eventually obtained. Again, the original color balance is disturbed in the output image data.

(c) in case the position of the correction function is set so as to cause the input gradation value=300 to correspond to a maximum output gradation value=255:

With the above correction function, there are obtained correction values of: (b, g, r)=(155, 205, 255). In this case, the respective correction values are confined within the possible output gradation range. Hence, no chopping is effected. Therefore, the output gradation is (B, G, R)=(155, 205, 255) and the original color balance is maintained.

As described above, if a correction value obtained from input image data of at least one color component of B, G, R is converted to a maximum output gradation value or a minimum output gradation value through the chopping, there occurs of loss or disturbance in the color balance.

Another problem may occur in the course of the conversion of color image data during a photographic processing as described next. In general, in image data obtained from a photographic film, a CD-ROM or the like, each pixel data is described in the RGB color system. However, its image quality adjustment is effected in such a manner that the hue and the luminance is varied independently of each other. Hence, if such adjustment is effected in the RGB color system, the respective color components need to be adjusted with maintaining good balance among them. Therefore, this adjustment operation tends to be extremely difficult. For this reason, according to a generally practiced technique, for the image quality adjustment, the image data described in the RGB color system are converted into a different color system such as the YCC color system (color space) which allows easier image quality adjustment and the image quality adjustment is effected in that different color space. Upon completion of the adjustment in the YCC color space for instance, the image data is then reversely converted into the RGB color system to be outputted, that is, to be exposed on a print paper or displayed on a monitor.

However, in the case of the RGB color system describing in the gradation range of 0~255, depending on the amount of adjustment made in the YCC color space, it may happen that a post-conversion value of a color component constituting the pixel data may become e.g. 280 overflowing from the maximum gradation value of 255 or may become e.g. −30 underflowing from the minimum gradation value of 0, such that the pixel data reversely converted into the RGB color system may not be fitted within the predetermined gradation range.

In the case of the conventional photographic processing apparatus, the chopping is effected. Namely, for pixel data overflowing from the maximum gradation value, the value of the overflowing color component is forcibly set to the maximum value of 255 of the gradation range or for pixel data underflowing from the minimum gradation value the value of the underflowing color component is forcibly set to the minimum value of 0 of the gradation range.

With the above-described chopping, however, for instance, color image data: (R, G, B)=(280, 240, 150) are "corrected" to color image data: (R, G, B)=(255, 240, 150). Therefore, in this case too, there occurs disturbance in the color balance before and after the correction. And, this results in change in the hue originally present in the image data, thus inviting reduction in the color reproducibility.

SUMMARY OF THE INVENTION

In view of the above-described state of the art, one object of the present invention is to provide an image processing technique capable of preventing loss or disturbance in the original color balance in output image data to be obtained after input/output conversions of color image data using a mathematical correction function shifted in a coordinate system. Another object of the present invention is to provide an image processing technique according to which a pixel value overflowing from a predetermined gradation range as a result of color image data conversion can be confined within the predetermined gradation range while restricting disadvantageous reduction in the color reproducibility.

For accomplishing these objects, according to one aspect of the present invention, in an image processing method for correcting pixel values of each pixel constituting color image data by shifting, in a coordinate system, a mathematical correction function defining correction values for input values, the method comprises the computer-implemented steps of:

(1) determining a maximum value and a minimum value among correction values: b, g, r of respective color components obtained for each pixel by using said correction function and then calculating differences: $\Delta b$, $\Delta g$, $\Delta t$ between the respective correction values of the respective color components and said minimum value and calculating also a difference: DR between said maximum value and said minimum value;

(2) dividing said calculated differences $\Delta b$, $\Delta g$, $\Delta r$ between the respective correction values of the respective color components and said minimum value by said calculated difference: DR between said maximum value and said minimum value, thereby to obtain color ratios: Cb, Cg, Cr for the respective color components;

(3) judging, as an inappropriate pixel, any pixel having a correction value overflowing from a predetermined maximum output gradation value and setting said overflowing correction value to said predetermined maximum output gradation value and judging also, as an inappropriate pixel, any pixel having a correction value underflowing from a predetermined minimum output gradation value and setting said underflowing correction value to said predetermined minimum output gradation value; and (4) effecting color balance adjustment so as to cause the correction values of said inappropriate pixel to agree with said respective color ratio thereof.

With this image processing method, the pixel values of each pixel constituting the color image data are corrected by shifting the correction function in the coordinate system. In this, depending on the amount of this shifting of the correction function, the correction value may deviate from the predetermined output gradation range (the gradation range of 0~255 in the case of 8-bit color data). Then, for an inappropriate pixel, i.e. a pixel having a pixel value deviated from the output gradation range as the result of the density correction using the shifted correction function, a density correction (color balance adjustment) is made for maintaining the same original color balance by the method of the present invention in the following manner. First, by using the differences: $\Delta b$, $\Delta g$, $\Delta r$ and the difference: DR, the color ratios: Cb, Cg, Cr are obtained. Then, if the correction value determined by the correction function overflows from the maximum output gradation value, the corresponding pixel value is set to the maximum output gradation value and the other pixel values are set in accordance with the corresponding color ratios obtained in advance. Similarly, if the correction value determined by the correction function underflows from the minimum output gradation value, the corresponding pixel value is set to the minimum output gradation value and the other pixel values are set in accordance with the corresponding color ratios obtained in advance. With this, the density correction can be made with maintaining the original color balance unchanged.

Specifically, if the correction value of at least one color component overflows from the maximum output gradation value, in the color balance adjusting step, sums of said minimum value and respective product values obtained by multiplying the differences: $\Delta b$, $\Delta g$, $\Delta r$ by the color ratios: Cb, Cg, Cr can be used as the respective final pixel values. And, if the correction value of at least one color component underflows from the minimum output gradation value, in the color balance adjusting step, the product value obtained by multiplying the maximum value by its color ratio can be used as its final pixel value.

In the above, the color component whose correction value has the maximum value provides the color ratio of 1. Hence, the pixel value set in the color balance adjusting step will become equal to the maximum output gradation value. On the other hand, the color component whose correction value has the minimum value, its color ratio is 0. Hence, the pixel value set in the color balance adjusting step will become equal to the minimum output gradation value. In these ways, if the correction value relating to at least one color component overflows from the maximum output gradation value, that is, for an inappropriate pixel, the correction value having the maximum value will be set to the maximum output gradation value and for the correction value having the minimum value will be set as it is to the minimum output gradation value and also the correction value having neither the maximum value nor the minimum value will be set to a value adjusted by the color ratio based on the minimum value. Conversely, in the case of the other type of inappropriate pixel, namely, if the correction value relating to at least one color component underflows from the minimum output gradation value, its correction value having the minimum value will be set to the minimum output gradation value, and its correction value having the maximum value will be set as it is to the maximum output gradation value. Hence, in the case of either type of inappropriate pixel, the pixel will be given pixel values maintaining the original color balance unchanged.

According to a further aspect of the present invention, in an image processing apparatus for correcting pixel values of each pixel constituting color image data by shifting, in a coordinate system, a mathematical correction function defining correction values for respective input values, for accomplishing the above-noted object, the apparatus comprises: a color balance adjustment section for adjusting color balance of the corrected image data, the color balance adjustment section including a calculating section, a judging section and a gradation value determining section;

wherein said calculating section is operable to determine a maximum value and a minimum value among correction values: b, g, r of respective color components obtained for each pixel by using said correction function and then to calculate differences: $\Delta b, \Delta g, \Delta r$ between the respective correction values of the respective color components and said minimum value and calculate also a difference: DR between said maximum value and said minimum value; said calculating section is further operable to divide said calculated differences $\Delta b, \Delta g, \Delta r$ between the correction values of the respective color components and said minimum value by said calculated difference: DR between said maximum value and said minimum value, thereby to obtain color ratios: Cb, Cg, Cr for the respective color components;

said judging section is operable to judge, as an inappropriate pixel, any pixel having a correction value overflowing from a predetermined maximum output gradation value and set said overflowing correction value to said predetermined maximum output gradation value and to judge also, as an inappropriate pixel, any pixel having a correction value underflowing from a predetermined minimum output gradation value and set this underflowing correction value to said predetermined minimum output gradation value; and said gradation value determining section effects color balance adjustment so as to cause the correction values of said inappropriate pixel to agree with said respective color ratio thereof.

It should be apparent the apparatus having the above-described construction can provide the same functions/effects as provided by the image processing method of the invention described above.

According to a still further aspect of the invention, in an image processing apparatus for outputting image data consisting of a plurality of image data described in the RGB color system in a predetermined gradation range, for accomplishing the above objects, the apparatus comprises: a conversion section for converting the image data described in the RGB color system into a different color system for image quality adjustment; an image quality adjustment section for effecting image quality adjustment on the image data converted into the different color system for image quality adjustment; a reverse conversion section for reverse converting the image quality adjusted image data back into the RGB color system; a color balance adjustment section; and a judging section for judging whether pixel values of each pixel constituting the reverse-converted image data are confined within said predetermined gradation range or not;

wherein for each pixel judged as being out of said predetermined gradation range by said judging section, said color balance adjustment section is operable effect a predetermined calculation on pixel values of the respective color components included in that pixel thereby to cause the pixel values thereof to be confined within said predetermined gradation range and said color balance adjustment section is further operable to adjust said pixel values of said pixel in such a manner as to fixedly maintain a ratio among the pixel values of the respective color components based on the minimum value among said pixel values.

With this construction, the image data described in the RGB color system are converted into a different color system for their image quality adjustment. Then, these image quality adjusted data are converted back into the RGB color system. In this, any pixel data deviated from the predetermined gradation range as the result of the adjustment is subjected to the adjustment by the color adjustment section after the reverse conversion, such that a ratio among the pixel values of the respective color components may be maintained the same before and after the adjustment based on the minimum value among them. Therefore, in the pixel data for correction, the original hue is maintained as much as possible before and after the correction, whereby the color reproducibility may be improved.

Preferably, the color balance adjustment section is operable to fixedly maintain also an average value of the pixel value of each color component contained in the pixel prior to the adjustment. With this construction, for a pixel which has obtained a pixel value out of the gradation range as the result of the reverse conversion to the RGB color system subsequent to the image quality adjustment operation effected in the different color system for this image quality adjustment, the ratio of each pixel value as compared with the other pixel values based on the minimum value among the pixel values of the respective color components is adjusted to be maintained the same before and after the correction; and in addition to this, the average value of the color component too is maintained to be confined within the predetermined gradation range. As a result, in addition to the original hue, the original luminance too can be maintained.

More specifically, the color balance adjustment section can be constructed such that when the judging section judges the maximum pixel value contained in the pixel as overflowing from the predetermined gradation range, this maximum pixel value is caused to agree with the maximum value of the predetermined gradation range.

With this construction, a pixel overflowing from the predetermined gradation range as the result of the reverse conversion to the RGB color system is corrected to be confined within the predetermined gradation range, thereby to minimize the gradation reduction.

Similarly, a pixel underflowing from the predetermined gradation range as the result of the reverse conversion to the RGB color system is corrected to be confined within the predetermined gradation range, thereby to minimize the gradation increase.

Further, if the color balance adjustment section is operable to maintain the ratio and/or the average value of the pixel value of the pixel for adjustment, a pixel which overflows from the RGB color system as the result of the reverse conversion may be corrected to be within the RGB color system with maintaining the hue and/or luminance the same. Consequently, the color reproducibility may be improved.

In addition to the above, the present invention relates also to an image processing program as a core component for realizing the above-described image correcting processing method or the image correcting processing apparatus and also a medium storing such image processing program.

Further and other features and advantages of the invention will become apparent upon reading the following detailed description of the preferred embodiments thereof with reference to the accompanying drawings.

DESCRIPTION OF THE PREFERRED EMBODIMENTS

First Embodiment

Figure 1:
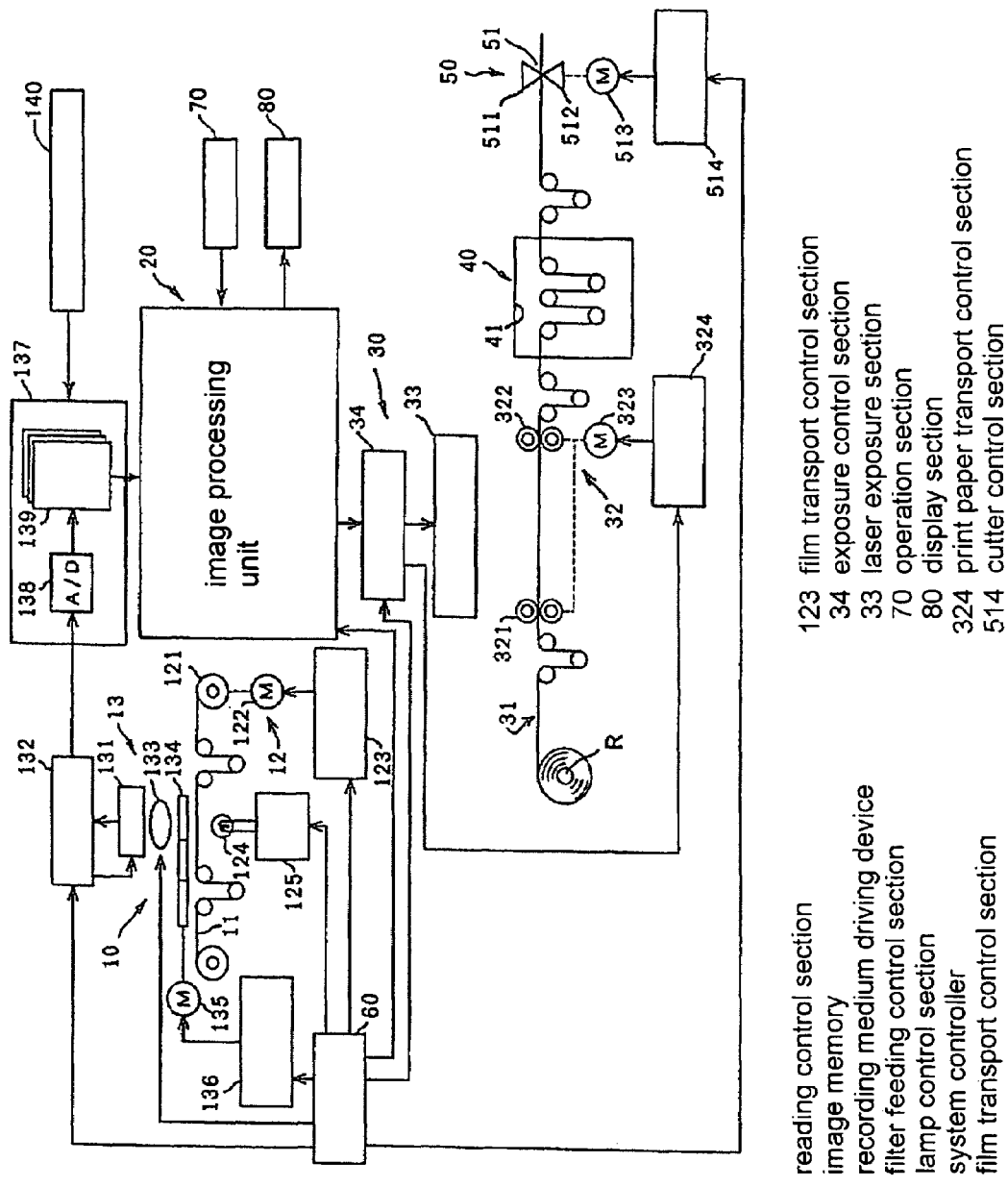
FIG. 1 is a view showing a schematic construction of a photographic processing apparatus implementing an image processing technique according to the present invention.

FIG. 1 is a view showing a schematic construction of a photographic processing apparatus implementing an image processing technique relating to the present invention. In this figure, the photographic processing apparatus includes a film scanner 10 for reading an image from e.g. a developed negative film or positive film and storing the image therein, an image processing unit 20 for effecting a predetermined image processing on image data sent from the film scanner 10 or image data directly read from an image recording medium, an image exposure section 30 for converting the processed image data into optical signals and exposing a print paper, a development section 40 for developing the exposed print paper, a cutting section 50 for cutting the developed and dried print paper into a one-frame piece, and a system controller 60 for controlling the operations of the entire system.

The film scanner 10 includes a film transporting section 12 for transporting the each frame of the developed film 11 to a reading position and an image reading section 13 for reading the image of each frame of the film 11.

The film transporting section 12 includes a take-up roller 121, a drive motor 122 for rotatably driving the take-up roller 121, a film transportation controlling section 123 for controlling the drive of the drive motor 122, a light-source lamp 124 disposed downwardly of the film 11, a lamp controlling section 125 for controlling the light emission amount of the lamp 124, etc. In operation, based on a control signal from the film transportation controlling section 123, the drive motor 122 is rotated, thereby to intermittently transport the film 11 by the take-up roller 121 by each frame amount, thus bringing respective frames thereof into opposition to the lamp 124 one after another.

The image reading section 13 includes a color imager 131 comprising e.g. CCD's lined up next to one another in the form of a linear array for reading image of each frame of the film, a reading controlling section 132 for controlling reading of the image by the imager 131, a lens 133 for focusing the image of each frame of the film 11 on a light-receiving face of the imager 131, an optical filter 134 interposed between the film 11 and the lens 133 for separating the image of the film 11 into the three color components of R, G, B, a filter drive motor 135 for moving the position of the optical filter 134, and a filter feeding controlling section 136 for controlling the drive of the filter drive motor 135.

The image read signals from the image reading section 13 are forwarded to an image inputting section 137. This image inputting section 137 includes an A/D converter 138 for converting the analog image signals read by the imager 131 into image data of a gradation described in a predetermined number of bits, e.g. 8 bits, and an image memory 139 comprising e.g. a RAM for storing the image data outputted from the A/D converter 138. This image memory 139 is provided for the three color components of R, G, B and operable to store the image data of each frame for each pixel and for each color component of R, G or B at an address designated by an unillustrated address controller.

Incidentally, the A/D converter 138 effects sampling and quantization on the analog image data for each color component sent from the film scanner 10 and outputs resultant digital image data (digital electric signals) for each color component. In this embodiment, the output digital image data are 16-bit digital data. (gradation range of 0~65535). However, the gradation range is not particularly limited in the present invention.

A recording medium driver 140 includes slots adapted for receiving various types of recording media such as a portable card memory for use in a digital camera and the driver 140 is operable to read the image data recorded in the recording medium charged into the slot and outputs the data to the image memory 139.

The image processing unit 20 can comprise either a hardware or a software or both. In this embodiment, the unit 20 is comprised of both hardware and software, so that the unit 20 effects various processing on the image data through a plurality of processing functions thereof to be detailed later.

The image exposure section 30 includes an exposure controlling section 34 for driving a laser exposure section 33 to be described later and a print paper transport section 32 for transporting an elongate print paper 31 roll wound about a roll R to the laser exposure section 33. The laser exposure section 33 includes three laser beam sources for emitting laser beams of R, G, B and is operable to convert the RGB image data into. R, G, B optical signals and output them onto the print paper roll 31. The exposure control section 34 is operable to control the print paper transport section 32 and the laser exposure section 33 in synchronism with each other and effects control such that an image of each frame may be accurately exposed for each color component of R, G, B on the print paper roll 31 based on the RGB image data for each color component of R, G, B sent from the image processing unit 20. The development section 40 includes liquid tanks 41 filled with developing liquids. In operation, the print paper roll 31 exposed by the laser exposure section 33 is transported by an unillustrated exposed print paper transporting section disposed downstream of the liquid tanks 41 and caused to be submerged in the developing liquids held within the liquid tanks 41, thereby to develop the latent image formed by the exposure of the print paper roll 31. The cutting section 50 includes a cutter 51 for cutting the dried print paper roll 31 along its width for each frame.

The system controller 60 includes an unillustrated CPU, and a ROM or the like storing therein a control program. Based on this control program, the controller 60 provides various instructions to various controlling sections, thereby to effect centralized control of the operations of the various controlling sections.

An operation section 70 comprises a keyboard, a mouse or the like, so that this section receives various operation instructions from an operator and outputs various instruction signals according to the operation instructions to the system controller 60 and/or the image processing unit 20.

A display section 80 comprises a CRT (cathode ray tube), a liquid crystal panel, a plasma display, etc. so as to display image data after a predetermined image processing by the image processing unit 20.

Figure 2:
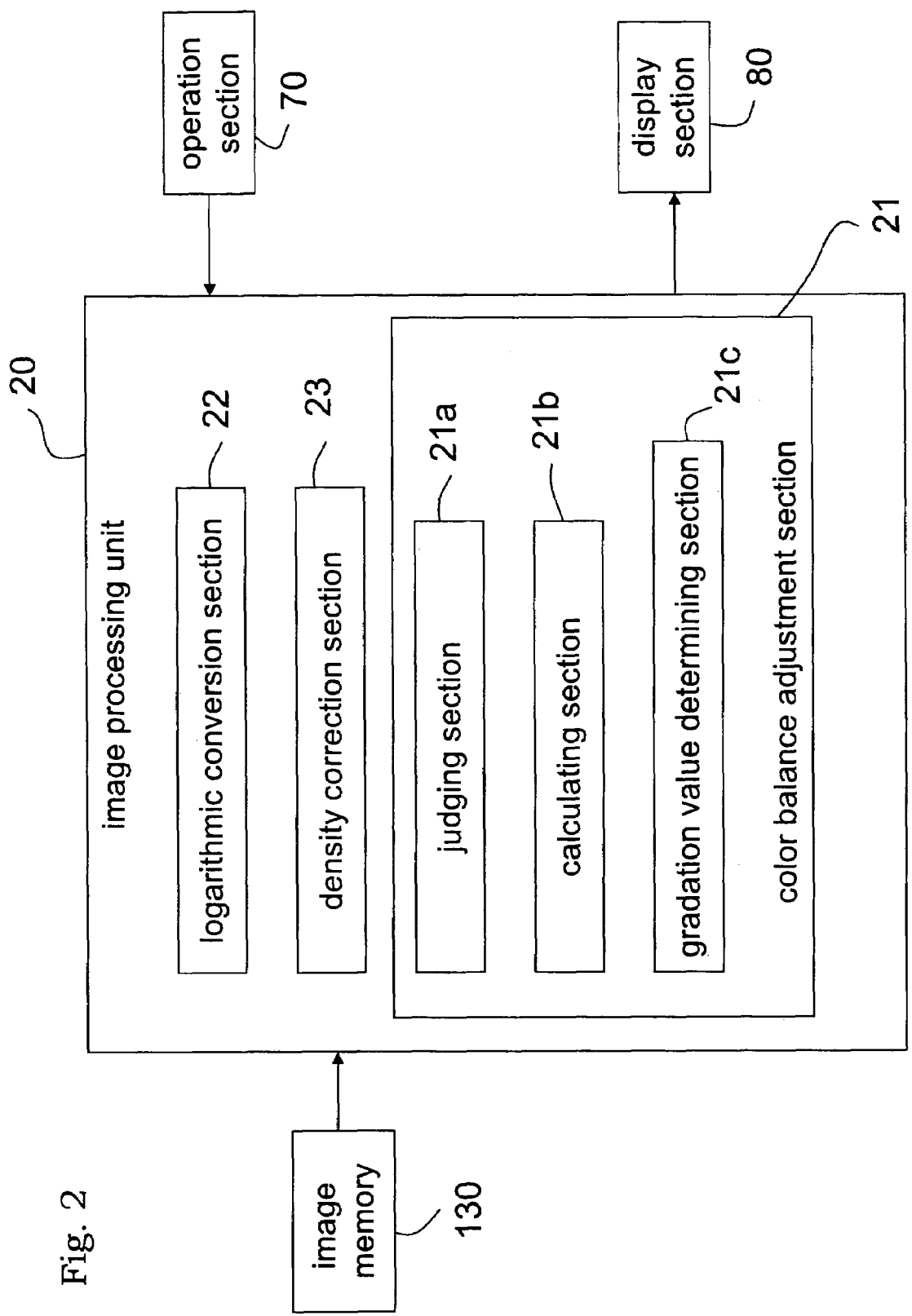
FIG. 2 is a functional block diagram schematically showing functional blocks of an image processing unit.

Next, typical processing functions of the image processing unit 20 will be described. This image processing unit 20, as shown in FIG. 2, includes a color balance adjustment section 21, a logarithmic conversion section 22 and a density correction section 23. The color balance adjustment section 21 includes a judging section 21a, a calculating section 21b and a gradation value determining section 21c.

Figure 3:
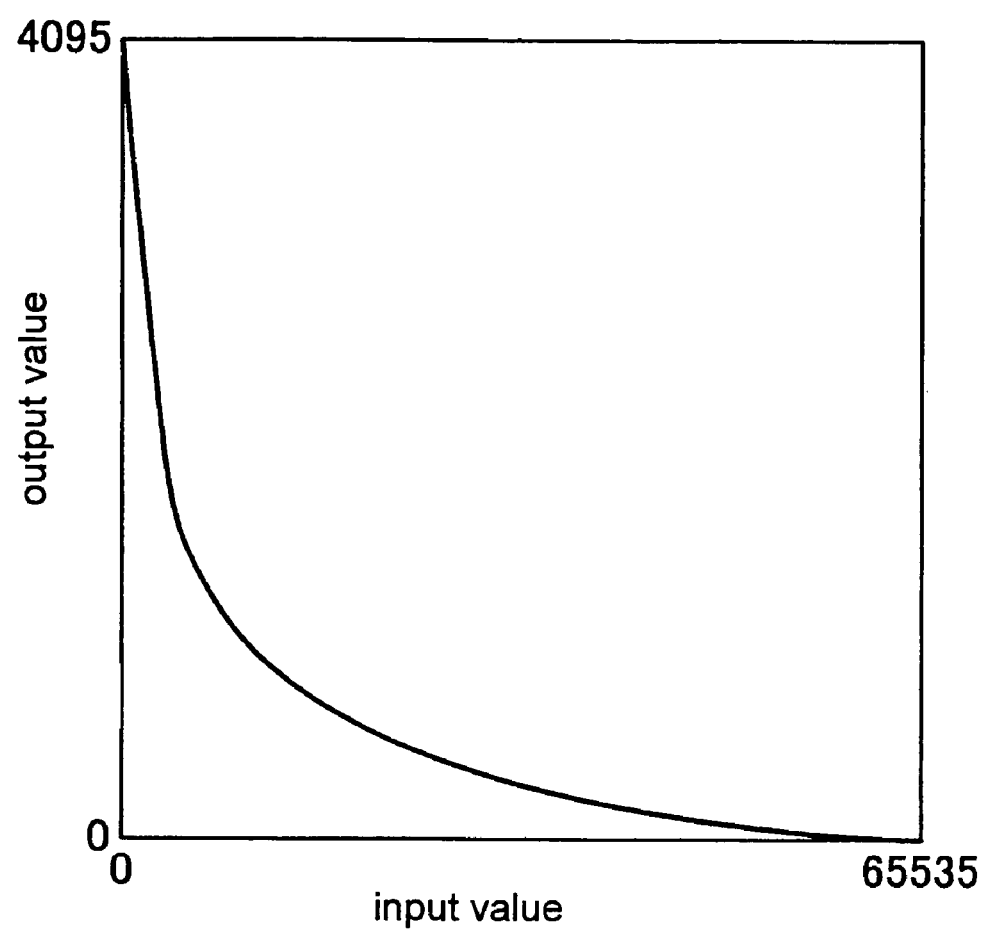
FIG. 3 is a graph showing an exposure density characteristics curve.

The logarithmic conversion section 22 is a functional block for effecting a logarithmic conversion on the 16-bit digital image data for each color component sent from the A/D converter 138 and then outputs 12-bit digital image data for each color. Here, "logarithmic conversion" means a process for adjusting gradation of the digital image with using an LUT (lookup table, a correction calculating device) storing therein an exposure density characteristics curve shown in FIG. 3. Further, in the case of the digital image data read from a negative film, with the above-described logarithmic conversion, the shading of the image on the negative film can be caused to agree with the shading of the image on the print paper.

The density correction section 23 is a functional block for effecting a density correction operation on the 12-bit digital data for each color sent from the logarithmic conversion section 22 and then outputting 8-bit digital data. Here, the "density correction" means a process using a correction function shown in FIG. 4 for correcting density values of an image to be reproduced on the print paper by adjusting correction values of output gradation corresponding to each input gradation (e.g. 2000 to 2500) within the distribution range of the input image data. Specifically, as shown in FIG. 5, in response to an input instruction from the operator, the position of the correction function is shifted, thereby to adjust the correction value for each output gradation corresponding to each input gradation of the digital image data. With this, the density of each output gradation can be adjusted by the amount of the shifted gradation. Incidentally, this conversion of the digital image data into the 8-bit data at the density correction section 23 of is effected for the purpose of outputting the digital image data in a different density range adapted for the sensitivity characteristics of the print paper.

Further, in the density correction in this embodiment, this correction is made by shifting the correction function thereby to adjust the correction value of each output gradation for each input gradation. Therefore, depending on the position of the shifted correction function or on a pixel value within the distribution range of the input image data, it is possible that a correction value thus obtained may be out of the possible range (0~255) of the output gradation (see the bold lines in FIG. 5). Then, in this embodiment, the judging section 21b determines, as an inappropriate pixel, a pixel which obtains, for at least one color component thereof, such correction value from the shifted correction function.

For such inappropriate pixel judged by the judging section 21a, the density correction section 23 converts the correction value out of the possible range of the output gradation into a maximum output gradation or a minimum gradation (this process is referred to as "chopping"). Specifically, the density correction section 23 converts a correction value greater than 256 obtained from the correction function to the maximum output gradation value of 255 and also converts a correction value smaller than −1 obtained from the correction function to the minimum gradation value of 0. Incidentally, when such chopping is effected, the original color balance of that pixel will be disturbed. For instance, for input gradation: IN (B, G, R)=(250, 150, 50), if the correction values obtained from the correction function are (b, g, r)=(300, 200, 100). The values obtained by the chopping are: OUT (B, G, R)=(255, 200, 100). In this case, the color balance obtained by the correction function is not disturbed. But, the color balance is disturbed after the chopping. Incidentally, in the present embodiment, the chopping process described above is effected. However, this chopping is not essential for implementing the present invention.

The calculating section 21*b* provides such functions as a difference calculating function and a ratio calculating function, so that for an inappropriate pixel detected or judged by the judging section 21*a*; the calculating section 21*b* determines the maximum value and the minimum value among the correction values for each color component obtained by the correction function for each pixel. And, for the inappropriate pixel and for each color component, the calculating section 21*b* calculates a difference between the maximum value and the minimum value and also a difference between the correction value obtained from the correction function and the minimum value and further calculates a color ratio from the respective differences. Incidentally, the term "color ratio" means a ratio used for effecting color balance adjustment on an inappropriate pixel at the gradation value determining section 21*c*. If desired or appropriate, the functional block for obtaining the respective differences and the functional block for obtaining the color ratio can be provided separately of each other.

The gradation value determining section 21*c* is a functional block for generating, for the inappropriate pixel, output gradation maintaining the original color balance and outputting 8-bit output image data. That is, for an inappropriate pixel which loses the color balance as the result of the chopping, the gradation value determining section 21*c* generates the digital image data (8 bits) for each color component retaining the original color balance.

Figure 6:
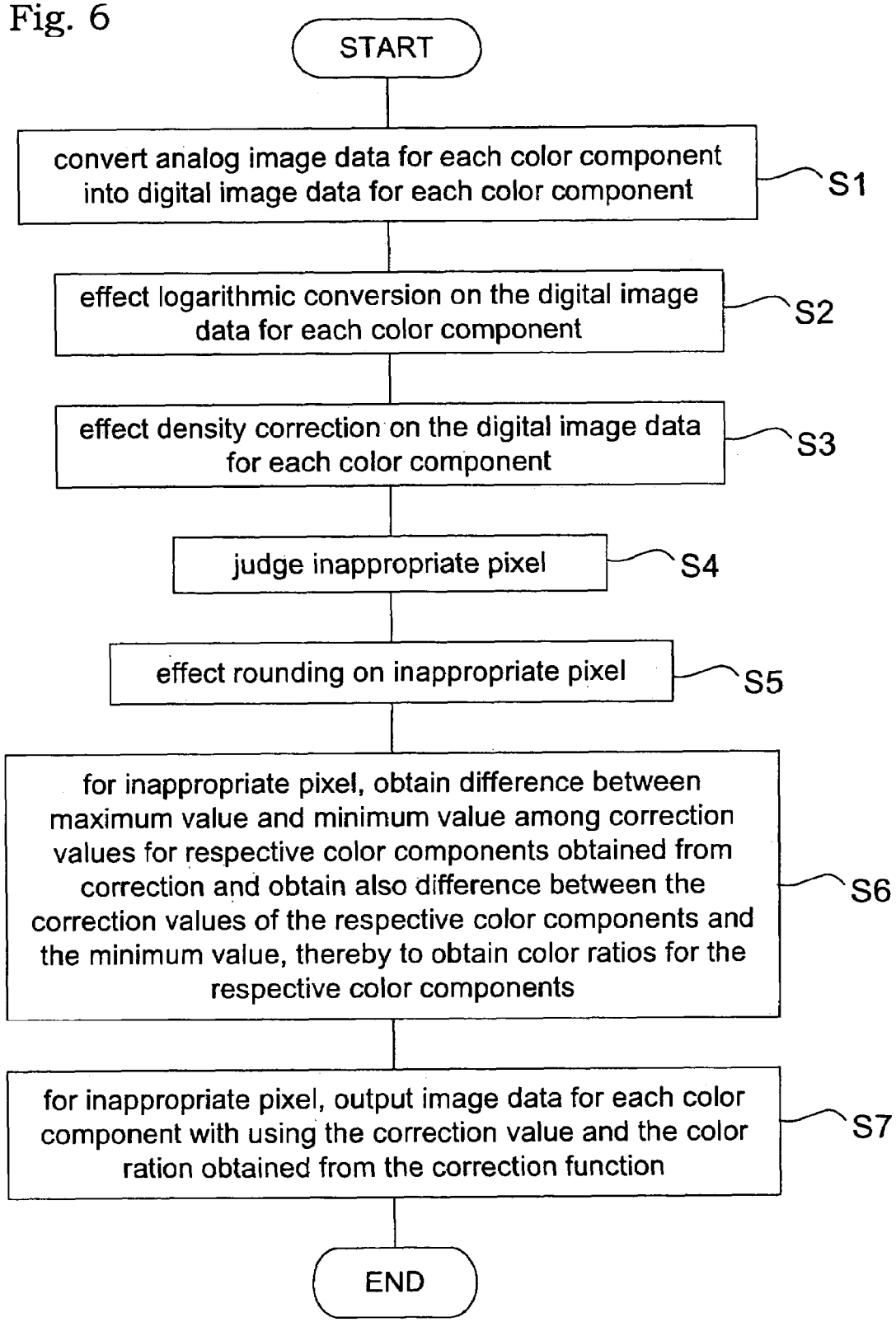
FIG. 6 is a flowchart illustrating flow of a series of processing steps relating to a first embodiment of the image processing method of the invention.

Next, with reference to the flowchart of FIG. 6, there will be described a series of process effected by the image processing unit 20 for determining output gradation values from input gradation values. First, the analog image data for each color component sent from the film scanner 10 are converted by the A/D converter 138 into digital data, which data are then mapped into the image memory 139 (step S1). The digital data (16-bit data) for each color component is then subjected to the logarithmic conversion by the logarithmic conversion section 22 (step S2). In this, the digital image data after the logarithmic conversion comprise 12-bit data for each color component, i.e. 36-bit color image data.

Further, the density correction section 23 effects the above-described density correction on the logarithmically converted digital image data (step S3). In this, the judging section 21*a* judges, as an inappropriate pixel, any pixel having, for at least one color component thereof, a correction value obtained from the correction function out of the output gradation range (0~255) (step S4). Next, on this inappropriate pixel, the density correction section 23 effects the chopping (step S5).

Thereafter, for the inappropriate pixel judged by the density correction section 23, the calculating section. 21*b* calculates the difference between the maximum value and the minimum value among the correction values for the respective color components obtained from the correction function, the difference between the correction value for each color and the minimum value and calculates also the color ratio for each color based on these differences. (step S6). And, for the inappropriate pixel, the gradation value determining section 21*c* calculates an output gradation value by using the correction value for each color obtained from the correction function and the color ratio and then outputs digital image data for each color (step S7). With this, for the inappropriate pixel, digital data with good color balance can be obtained. Further details of the processes effected at steps S4 through S7 will be given later herein.

Thereafter, the image processing unit 20 effects necessary density correction and color balance adjustment on the image data and converts the data into print data to be transmitted to the exposure control section 34. Then, based on this print data, the exposure control section 34 controls the laser exposure section 33 for printing an image on the print paper.

Next, the details of the processes effected as steps S4 through S7 will be described. First, the process (step S4) for detecting an inappropriate pixel from the digital image data for each color after the density correction will be described. In this embodiment, in the density correction, the 12-bit image data is converted into 8-bit digital image data so that the digital image data can be inputted by the density range describable by a photographic film and also the digital image data can be outputted in the density range adapted for the sensitivity characteristics of the print paper.

Figure 4:
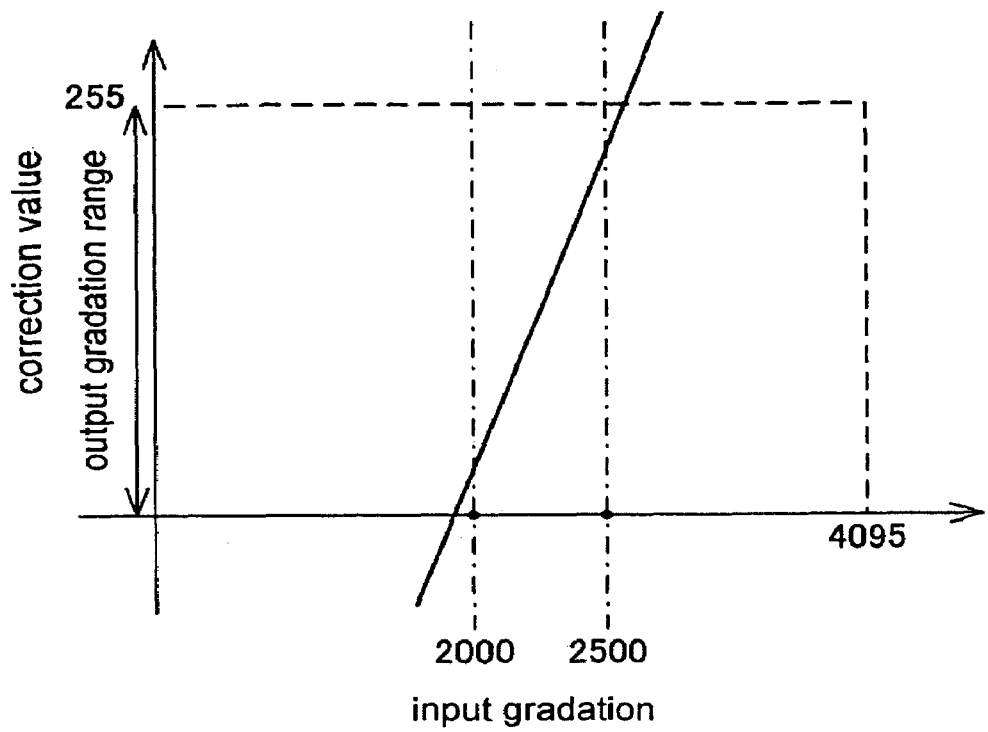
FIG. 4 is a graph showing a correction function set in a density correcting section.
Figure 5:
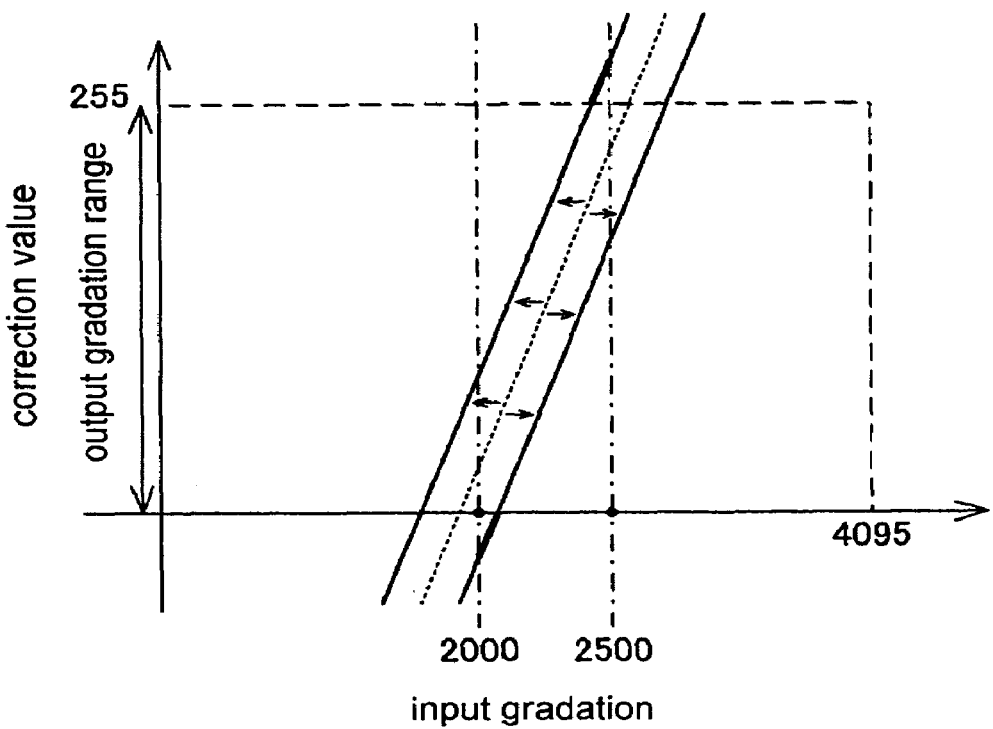
FIG. 5 is a graph in which the correction function shown in FIG. 4 is shifted in position.

Further, for the conversion of the 12-bit data into the 8-bit data in this density correction, in order to reproduce gradation change in the input image data as it is in the output image data, by using the correction function shown in FIG. 4 and FIG. 5, a portion of the possible gradation range of the input image data is outputted as it is. Accordingly, since the 8-bit digital image data is outputted in the case of the density correction of this embodiment, the output gradation range is 0~255.

On the other hand, as shown in FIG. 5, the density correction is the process of adjusting each correction value of each output gradation corresponding to each input gradation by shifting the position of the correction function. Therefore, depending on the position of the shifted correction function or on a pixel value in the distribution range of the input image data, it is possible that the correction value obtained from the correction function has a value greater than 256 or a value smaller than −1. That is, the correction value obtained from the correction function can overflow or underflow from the possible range of output gradation. Hence, the judging section 21*a* detects, as an inappropriate pixel, such pixel which has obtained from the correction function a correction value for at least one color component deviated from the 8-bit output gradation range.

Next, the chopping process (step S5) effected on the inappropriate pixel will be detailed. If a correction value obtained from the correction function is out of the possible range of the output gradation, it is not possible to output this correction value as it is as digital image data. Therefore, before being outputted as digital image data, such correction value needs to be converted into the maximum output gradation value or the minimum output gradation value. Specifically, if the correction value obtained from the correction function is greater than 256, the density correction section 23 converts this into the maximum output gradation value of 255. Conversely, if the correction value obtained from the correction function is smaller than −1, the density correction section 23 converts this into the minimum output gradation value of 0.

Therefore, the color balance will be disturbed in the inappropriate pixel which has been subjected to the above-described chopping for at least one color component thereof. For instance, supposing correction values: (b, g, r)=(200, 250, 300) are obtained from the correction function, r=300 overflows from the output gradation range of the density correction section 23. In this case, with the chopping described above, there are obtained: OUT (B, G, R)=(200, 250, 255). In this manner, the color balance has been disturbed as the result of the chopping.

Next, there will be described in details the process (step S6) for calculating the difference between the maximum value and the minimum value among the correction values for the respective color components obtained from the correction function, the difference between the correction value for each color component and the minimum value and calculating also the color ratio for each color component based on these differences. In this process, the calculating section 21b carries out the following calculations for each inappropriate pixel.

Suppose correction values (b, g, r) were obtained by effecting the density correction on input gradation values: IN (B, G, R) and "min" and "max" represent the minimum value and the maximum value among the correction values (b, G, r). Then, the following calculations are carried out.

$\Delta b=b-\min$ $\Delta g=g-\min$ $\Delta r=r-\min$ $DR=\max-\min.$

Then, the following calculations are carried out.

$Cb=\Delta b \div DR$ $Cg=\Delta g \div DR$ $Cr=\Delta r \div DR$ where (Cb, Cg, Cr) are color ratios obtained for respective color components of the inappropriate pixel.

Next, the process (step S8) effected by the gradation value determining section 21c will be described in details. The gradation value determining section 21c carries out the following calculations for each inappropriate pixel, thereby to obtain digital image data for each color component (this process will be referred to as "color balance adjustment"). If the digital image data obtained by this color balance adjustment are (B', G', R'), then, for an inappropriate pixel which obtains from the correction function a correction value for at least one color component greater than the maximum output gradation value, the output gradation values for the respective color components are obtained by the following calculations.

$B'=(255-\min) \times Cb+\min$ $G'=(255-\min) \times Cg+\min$ $R'=(255-\min) \times Cr+\min$ On the other hand, for an inappropriate pixel which has obtained from the correction function a correction value for at least one color component smaller than the minimum output gradation value, the output gradation values for the respective color components are obtained by the following calculations.

$B'=\max \times Cb$ $G'=\max \times Cg$ $R'=\max \times Cr$

EXAMPLE 1

For a pixel A having input gradation values of IN (B, G, R)=(150, 200, 250), suppose correction values: (b, g, r)=(200, 250, 300) were obtained from the correction function. In this, since the density correction section 23 outputs 8-bit digital image data, the maximum output gradation value is 255. Therefore, the correction value: r=300 obtained from the correction function overflows from the possible range of the output gradation. Therefore, this pixel A is judged as an inappropriate pixel by the judging section 21a. Hence, the chopping is effected on this: r=300 of the pixel A, thereby to obtain: (B, G, R)=(200, 250, 255).

Next, for the pixel A, the calculating section 21b calculates the differences $\Delta b$, $\Delta g$, $\Delta r$ and DR. Of the correction values b, g, r obtained from the correction function, the minimum value is b=200 and the maximum value is r=300. Then, the above calculations are carried out as:

$\Delta b=b-\min=200-200=0$ $\Delta g=g-\min=250-200=0.50$ $\Delta r=r-\min=300-200=100$ $DR=\max-\min=300-200=100$ Further, for this pixel A, calculating section 21b further calculates Cb, Cg, Cr as follows.

$Cb=\Delta b \div DR=0 \div 100=0$ $Cg=\Delta g \div DR=50 \div 100=0.5$ $Cb=\Delta b \div DR=100 \div 100=1.0$ Also, of the correction values obtained from the correction function, r=300 is a value exceeding the maximum output gradation value. Therefore, the gradation value determining section 21c calculates the output gradation values for the pixel A by the following calculations. In these calculations, values in the decimal point positions are rounded.

$B'=(255-\min) \times Cb+\min=(255-200) \times 0+200=200$ $G'=(255-\min) \times Cg+\min=(255-200) \times 0.5+200=228$ $R'=(255-\min) \times Cr+\min=(255-200) \times 1.0+200=255$ In the above, the input gradation values of the pixel A are (B, G, R)=(150, 200, 250). On the other hand, the correction values thereof obtained from the correction function in the density correction are: (b, g, r)=(200, 250, 300). And, the values thereof obtained after the chopping are (B, G, R)=(200, 250, 255).

Here, the color balance is not disturbed in the values obtained from the correction function in the density correction. Whereas, the color balance is disturbed in the values obtained after the chopping. However, the final output gradation values for the pixel A obtained by the color correction section 8 are: OUT (B', G', R')=(200, 228, 255). Hence, it is understood that the color balance in the final values is less disturbed than the color balance after the chopping.

EXAMPLE 2

For a pixel C having input gradation values of IN (B, G, R)=(0, 50, 100), suppose correction values: (b, g, r)=(-50, 0, 100) were obtained from the correction function in the density correction. In this, the minimum output gradation value of the digital image data outputted from the density correction section 23 is 0. Therefore, the correction value: b=-50 obtained from the correction function underflows from the possible range of the output gradation. Therefore, this pixel C is judged as an inappropriate pixel by the density correction section 23. Hence, the chopping is effected on this: b=-50 of the pixel C, thereby to obtain: (B, G, R)=(0, 0, 100).

Next, for the pixel C, the calculating section 21b calculates the differences $\Delta b$, $\Delta g$, $\Delta r$ and DR. Of the correction values b, g, r obtained from the correction function, the minimum value is b=−50 and the maximum value is r=100. Then, the above calculations are carried out as:

$$\Delta b = b - \min = -50 - (-50) = 0$$

$$\Delta g = g - \min = 0 - (-50) = 50$$

$$\Delta r = r - \min = 100 - (-50) = 150$$

$$DR = \max - \min = 100 - (-50) = 150$$

Further, for this pixel C, the calculating section 21b further calculates Cb, Cg, Cr as follows.

$$Cb = \Delta b \div DR = 0 \div 150 = 0$$

$$Cg = \Delta g \div DR = 50 \div 150 = 0.33 \ldots$$

$$Cb = \Delta b \div DR = 150 \div 150 = 1.0$$

Also, of the correction values obtained from the correction function, b=−50 is a value smaller than the minimum output gradation value. Therefore, the gradation value determining section 21c calculates the output gradation values for the pixel C by the following calculations. In these calculations, values in the decimal point positions are rounded.

$$B' = \max \times Cb = 100 \times 0 = 0$$

$$G' = \max \times Cg = 100 \times 0.33 \ldots = 33$$

$$R' = \max \times Cr = 100 \times 1.0 = 100.$$

In the above, the input gradation values of the pixel C are (B, G, R)=(0, 50, 100). Whereas, the correction values thereof obtained from the correction function in the density correction are: (b, g, r)=(−50, 0, 100). And, the values thereof obtained after the chopping are (B, G, R)=(0, 0, 100).

Here, the color balance is not disturbed in the values obtained from the correction function in the density correction. Whereas, the color balance is disturbed in the values obtained after the chopping. However, the final output gradation values for the pixel C obtained by the color correction section 8 are: OUT (B', G', R')=(0, 33, 100). Hence, it is understood that the color balance in the final values is less disturbed than the color balance obtained after the chopping.

To summarize the above-described image processing, the density correction of the output image is effected by shifting, in the coordinate system, the correction function showing correction values for input gradation values of the digital image data. In this, with such shifting of the correction function in the coordinate system, although the color balance may be maintained among the correction values for the respective color components obtained from the correction function, these correction values may overflow or underflow from the possible range of output gradation.

Then, according to the above-described process, for each pixel, of correction values of the respective color components obtained from the correction function, the maximum value and the minimum value thereof are obtained, respectively. Then, the differences between the respective correction values for the respective color components and the minimum value is obtained. With this, it is possible to obtain the difference between the correction value of the respective color components and the smallest, i.e. the minimum correction value thereof.

Next, the difference between the maximum value and the minimum value is obtained. And, the difference between the correction value for each color component and the minimum value is divided by the difference between the maximum value and the minimum value. With this, for each color component, there can be obtained the color ratio which is the value relative to the difference from the minimum correction value.

Further, at step S7, based on the correction values for the respective color components obtained from the correction function and the color ratios described above, the digital image data for the respective color components are outputted (calculation of output gradation values).

As a result, for a color component whose correction value from the correction function exceeds the maximum output gradation value, its output image data is set to the maximum output gradation value, so that the output gradation values of the other color components will be set so that the ratios of the differences from the minimum value may agree with the color ratios described above. With this, it is possible to produce output gradation values maintaining the original color balance within the possible range of output gradation. On the other hand, for a color component whose correction value from the correction function falls short of the minimum output gradation value, its output image data is set to the minimum output gradation value, so that the output gradation values of the other color components will be set so that the ratios of the differences from the minimum value may agree with the color ratios described above. With this, it is possible to produce output gradation values maintaining the original color balance within the possible range of output gradation. In these manners, the density correction is made possible with maintaining the original color balance.

Further, the color ratio is the value obtained by calculating the difference between the maximum value and the minimum value and then dividing the difference between the correction value obtained for, each color component and the minimum value by the difference between the maximum value and the minimum value. Therefore, of the respective color components, the color ratio of a component whose correction value is the minimum value becomes 0 and the color ratio of a component whose correction value is the maximum value becomes 1.

Then, according to the above-described process, in case a correction value for at least one color component exceeds the maximum output gradation value, the output gradation value for each color component is the value obtained by multiplying the difference between the maximum output gradation value and the minimum value by the color ratio and then adding the minimum value to this product value. In this, as for the color component whose correction value is the maximum value, its color ratio is 1. Therefore, the output gradation value obtained by the above process becomes identical to the maximum gradation value. On the other hand, as for the color component whose correction value is the minimum value, its color ratio is 0. Therefore, the output gradation value obtained by the above process becomes identical to the minimum gradation value.

Accordingly, with the above-described process, in case the correction value for at least one color component exceeds the maximum output gradation value, the output gradation value of the color component whose correction value is the maximum value can be set to the maximum output gradation value. Also, as for the color component whose correction values is the minimum value, this minimum value can be set as it is as the output gradation value. Therefore, if the correction value for at least one color component exceeds the maximum output gradation value, this correction value can be set as it is as the maximum output gradation value and at the same time output gradation for each color component can be generated with maintaining the color balance according to the color ratios.

Further, with the above-described process, if the correction value for at least one color component falls short of the minimum output gradation value, the value obtained by multiplying the maximum value by the color ratio for each color component is employed as the output gradation value for each color component. In this, as for the color component whose correction value is the minimum value, its color ratio is 0. Hence, the output gradation obtained by the above process will be 0, that is, identical to the minimum output gradation value. On the other hand, as for the color component whose correction value is the maximum value, its color ratio is 1. Hence, the output gradation obtained by the above process will be identical to the maximum output gradation value.

Therefore, according to the above-described process, if a correction value for at least one color component is smaller than the minimum output gradation value, the output gradation value of the color component whose correction value is the minimum value can be the minimum output gradation value and also the output gradation value of the color component whose correction value is the maximum value can be set directly as the minimum output gradation value. In this way, if the correction value obtained by the density correction is smaller than the minimum output gradation value, this correction value can be set to the minimum output gradation value and at the same time it is possible to generate output gradation values for the respective color components within maintaining the color balance according to the color ratios.

Figure 7A:
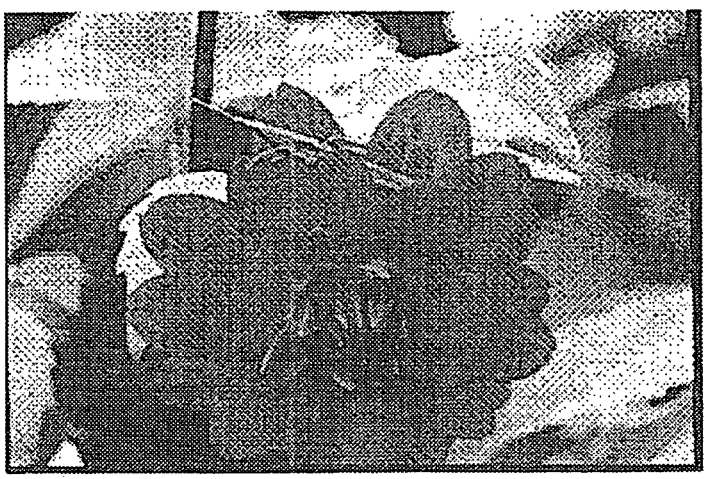
FIGS. 7a, 7b and 7c show photographic images after their color balance adjustment on digital image data obtained by a film scanner, FIG. 7a showing an image with density correction in highlight tone, FIG. 7b showing an image with density correction in halftone, FIG. 7c showing an image with density correction in shadow tone, respectively.
Figure 7B:
Figure 7C:
Figure 8A:
FIGS. 8a, 8b and 8c show images after their chopping process on the digital image data obtained by the film scanner, FIG. 8a showing an image with density correction in highlight tone, FIG. 8b showing an image with density correction in halftone, FIG. 8c showing an image with density correction in shadow tone, respectively.
Figure 8B:
Figure 8C:

In the above, sample images after the color balance adjustment of inappropriate pixels by the color balance adjustment section 21 are shown in FIGS. 7a, 7b, 7c. Further, sample images obtained after the chopping process of inappropriate pixels and without the color balance adjustment thereof by the color balance adjustment section 21 are shown in FIGS. 8a, 8b, 8c. Incidentally, the images of FIGS. 7a and 8a were subjected to a same density correction (in highlight tone). The images of FIGS. 7b and 8b were subjected to a same density correction (in halftone). The images of FIGS. 7c and 8c were subjected to a same density correction (in shadow tone). From FIGS. 8a, 8b and 8c, it may be understood that with increase in image density there occurs the trouble of thinning of yellowish portions of the petals and details while no such trouble is seen in the images of FIGS. 7a, 7b and 7c.

Figure 9:
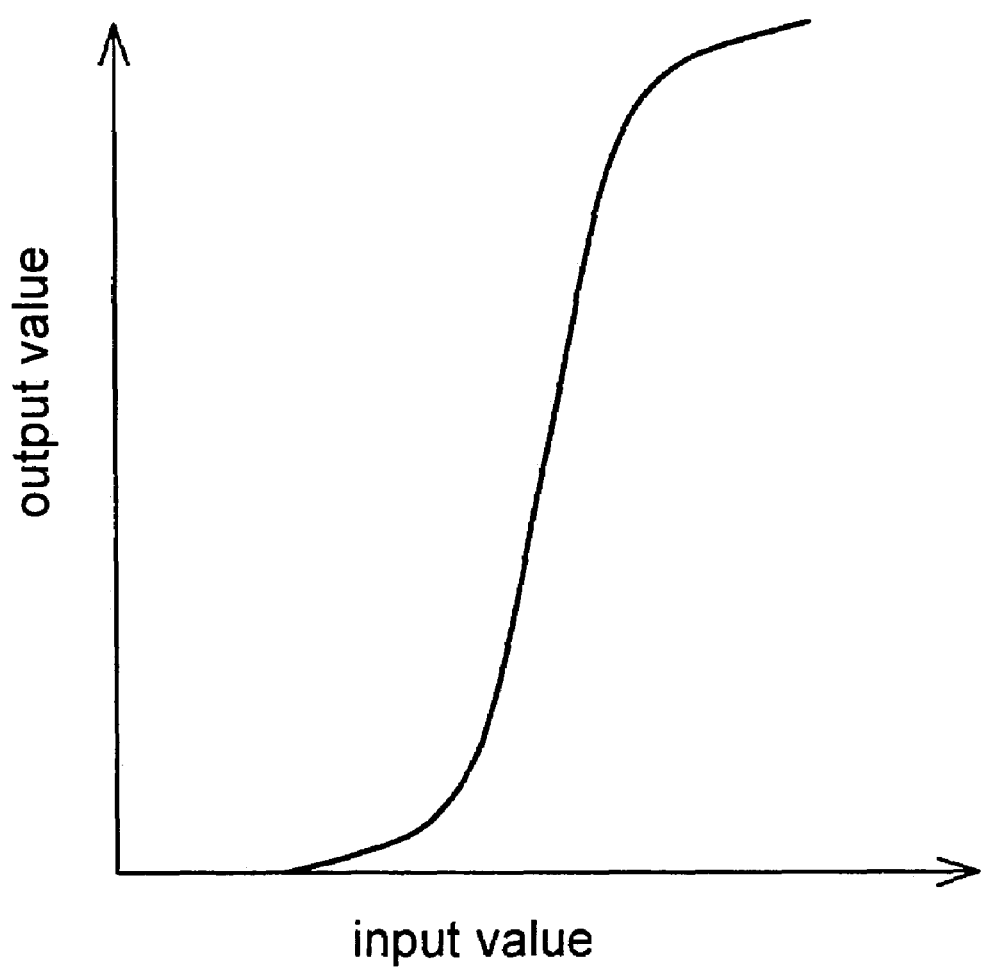
FIG. 9 is a graph showing a gamma curve.

Incidentally, in the case of the correction function described above, the input gradation of digital image data is converted into the output gradation by means of the linear expression. However, the present invention is not limited to such linear function, but e.g. a gamma curve shown in FIG. 9 may be employed instead.

Second Embodiment

Figure 10:
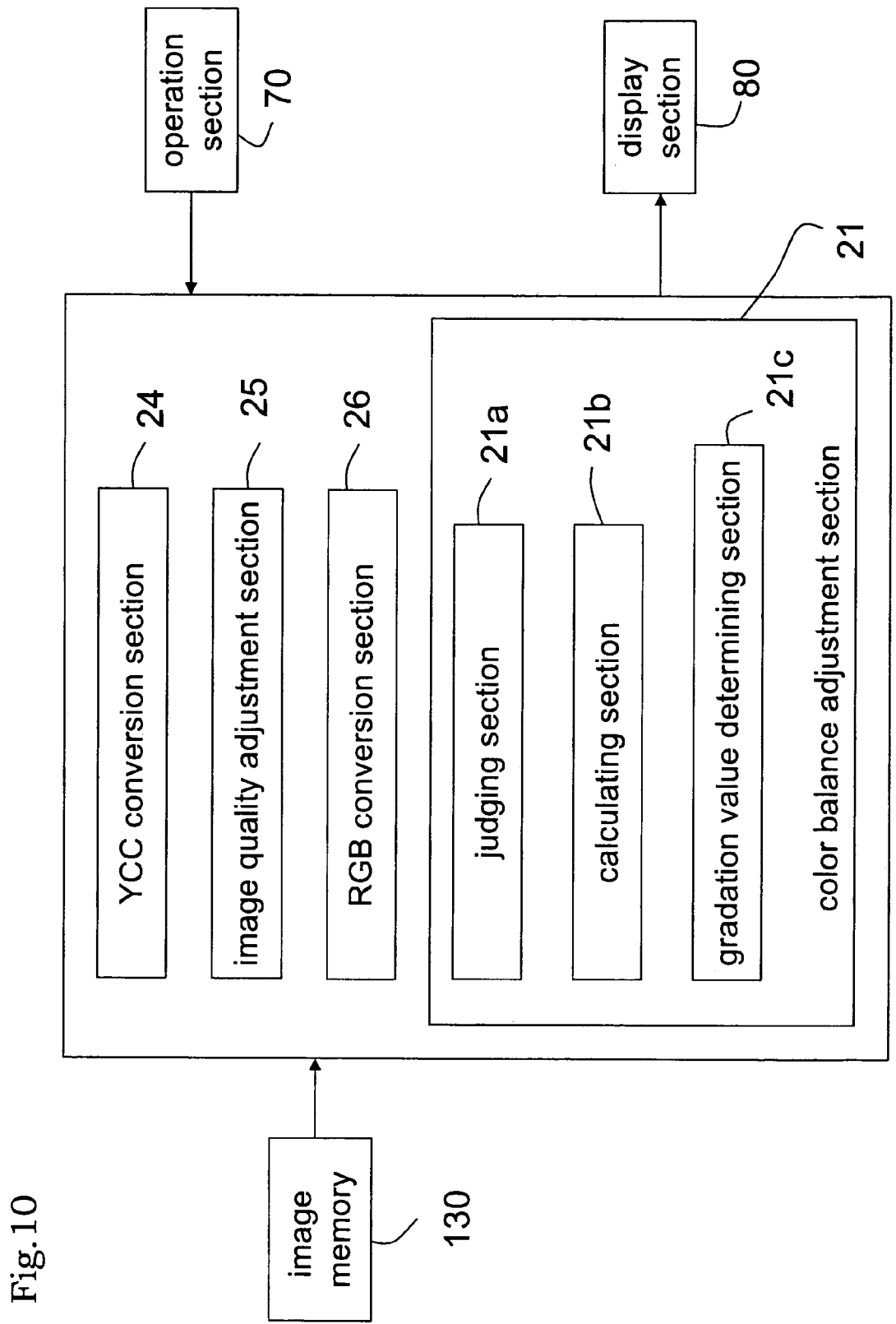
FIG. 10 is a functional block diagram of an image processing unit relating to a second embodiment of the invention.

Next, a second embodiment of the present invention will be described. In this second embodiment, the image processing unit 20 has a construction shown in FIG. 10. In this embodiment too, the unit 20 has the color balance adjustment section 21. The basic principle of the unit is substantially the same, but differs in e.g. calculation methods employed. Further, this image processing unit 20 includes an YCC conversion section 24, an image quality adjustment section 25 and an RGB conversion section 26.

The YCC conversion section 24 is operable for effecting YCC conversion on one frame amount of image data read from the image memory 139, thereby to convert the image data described in the RGB color system (RGB color space) into image data described in the YCC color system (YCC color space). As is known, the YCC color system describes image data in terms of luminance (Y), blue color difference (C1) and red color difference (C2). The YCC image data can be obtained by effecting a calculation of Formula (1) on the RGB image data. Specifically, the YCC conversion section 24 effects this calculation of Formula 1 on the respective RGB pixel data constituting the one frame amount of RGB image data, thereby to obtain one frame amount of YCC image data.

$$\begin{pmatrix} Y \\ C1 \\ C2 \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix} \qquad \text{formula (1)}$$

where a11 through a33 are predetermined coefficients for use in the conversion into the YCC color system.

When image quality adjustment is to be made on an image before its printing, it is sometimes desired to adjust luminance and colors independently of each other, such as when it is desired to adjust luminance alone while maintaining the hue unchanged. However, for effecting such adjustment on the RGB image data, adjustments are required among the color components with consideration to the balance among the respective color components R, G, B. These adjustments are extremely complicated and require considerable skill. Then, according to the photographic processing apparatus of the invention, the RGB image data is first converted into the YCC color space and then the image quality adjustment is made on the image data in the YCC color space.

Specifically, upon reception of an operation signal outputted from the operation section 70 in response to an operation instruction from an operator, the image quality adjustment section 25 effects various image quality adjustments such as adjustment of the slope of the gamma curve, adjustment of contrast, adjustment of the color densities of R, G, B components. Alternatively, the image quality adjustment section 25 may be adapted for automatically effecting the image quality adjustment of the YCC image data based on various information such as the type of the digital camera, the type of the photographic film used, not based on such operator's operation instruction.

The RGB conversion section 26 effects the following calculation of Formula (2) on the respective pixel data (YCC image data) constituting the image-quality-adjusted YCC image data, thereby to convert the YCC image data into RGB image data (reverse conversion).

$$\begin{pmatrix} R \\ G \\ B \end{pmatrix} = \begin{pmatrix} b11 & b12 & b13 \\ b21 & b22 & b23 \\ b31 & b32 & b33 \end{pmatrix} \begin{pmatrix} Y \\ C1 \\ C2 \end{pmatrix} \qquad \text{formula (2)}$$

where b11 through b33 are predetermined coefficients for use in the conversion into the RGB color system.

On each RGB pixel data of the RGB image data reverse converted from the YCC image data by the RGB conversion section 26, the judging section 21a of the color balance adjustment section 21 judges whether the respective color components thereof are confined within the predetermined gradation range or not. In this embodiment, each color component is described in 8 bits. Hence, the possible range of gradation of each color component is 0~255. Therefore, if at least one color component of the color components has a gradation value below 0 or greater than 256, the judging section 21a judges the pixel data including this component as a pixel data out of the gradation range. Further, if at least one color component has a gradation value greater than 256, such as (R, G, B)=(280, 230, 150), the judging section 21a judges the pixel data has overflowed from the range. Conversely, if at least one color component has a gradation value below 0, such as (R, G, B)=(−30, 60, 80), the judging section 21a judges the pixel data has underflowed from the range.

For such RGB pixel data judged as an overflowed or underflowed data by the judging section 21a, the calculating section 21b and the gradation value determining section 21c of the color balance adjustment section 21 implements either Method 1 or Method 2 described below, thereby to effect correction so that the gradation values of the respective color components may be confined within the gradation range of 0~255.

(Method 1)

Method 1 is a method for maintaining the hue unchanged before and after the correction in the correction for causing the correction-subject RGB image data to be confined within the gradation range. Specifically, a calculation of Formula (3) below is effected on overflowed RGB image data and a calculation of Formula (4) below is effected on underflowed RGB data, so that the RGB image data may be confined within the gradation range.

$$R' = \min + \underbrace{\frac{R - \min}{\max - \min}}_{a}(255 - \min)$$

$$G' = \min + \underbrace{\frac{G - \min}{\max - \min}}_{b}(255 - \min)$$

$$B' = \min + \underbrace{\frac{B - \min}{\max - \min}}_{c}(255 - \min)$$

formula (3)

$$R' = 0 + \underbrace{\frac{R - \min}{\max - \min}}_{d}(\max - 0)$$

$$G' = 0 + \underbrace{\frac{G - \min}{\max - \min}}_{e}(\max - 0)$$

$$B' = 0 + \underbrace{\frac{B - \min}{\max - \min}}_{f}(\max - 0)$$

formula (4)

where, min: the minimum value of a color component constituting the pixel data to be corrected, max: the maximum value of a color component constituting the pixel data to be corrected, R, G, B: gradation values of the respective color components before correction; and R', G', B': gradation values of the respective color components after correction.

The part expressions a through c shown in the second terms of Formula (3) represent values obtained by dividing the color difference values (R−min, G−min, B−min) relative to the minimum value (min) of the color components by the difference value (max−min) between the maximum value and the minimum value of the color components. Therefore, these part expressions a through c represent ratios relative to the maximum value of the color difference values (R−min, G−min, B−min). Then, the difference value (255−min) between the maximum value 255 of the gradation range and the minimum value min of the color components is multiplied by these ratios respectively. Then, to the respective resultant products, the minimum value min of the color components is added, thereby to obtain R', G', B'. Therefore, the ratios of the corrected RGB image data (R', G', B') relative to the maximum value of the color difference values (R'−min, G'−min, B'−min) agree with the ratios of the RGB pixel data before the correction, whereby the original hue is maintained. Further, since the values of these a through c are all smaller than 1, the values of R', G', G' are all smaller than 255, so that the final RGB pixel data after the correction are confined within the possible gradation range.

Figure 11:
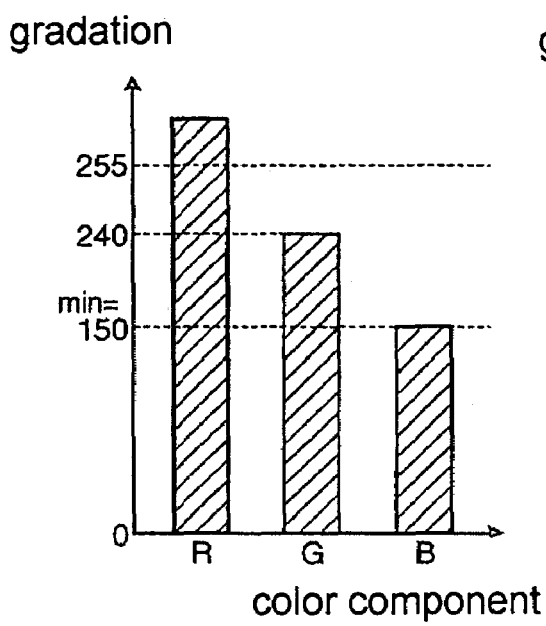
FIGS. 11a and 11b are graphs explaining Method 1 for correcting overflowing RGB pixel data to be confined within a gradation range 0~255, FIG. 11a showing the RGB pixel data before the correction, FIG. 11b showing the RGB pixel data after the correction.
Figure 11:
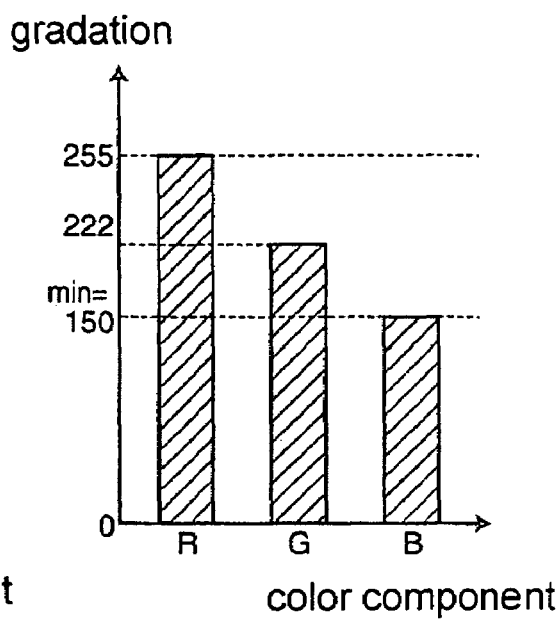

FIGS. 11a and 11b are graphs for explaining a case wherein RGB pixel data (overflowed RGB pixel data) having gradation values of respective components described as (280, 240, 150) are corrected by Method 1 to be confined within the gradation range. FIG. 11a shows the RGB pixel data before the correction and FIG. 11b shows the RGB pixel data after the correction. Further, in these FIGS. 11a, 11b, the vertical axis represents the gradation value and the horizontal axis represents the R, G, B color components. Since the minimum value min of the color components is: min=150, the color difference values are (130, 90, 0) and the ratio among the respective color difference values relative to the maximum value 130 thereof is 1.00:0.69:0.00.

As described above, the RGB pixel data (280, 240, 150) before the correction are corrected by Formula (3) into R'=255, G'=222, B'=150. In this resultant RGB pixel data (255, 222, 150), the ratio among the color difference values is 1:0.69:0. Hence it may be understood that the hue is maintained the same before and after the correction. Also, the overflowed R component is corrected to 255 which is the maximum value of the gradation range. This means that the correction to the gradation range has been achieved with minimum reduction of the gradation range.

Like Formula (3) described above, the part expressions d through f shown in the second terms of Formula (4) represent the ratios of the respective color difference values relative to the maximum value thereof. And, by multiplying the difference between the maximum value of the color components and the minimum value 0 of the gradation range by these ratios respectively and then adding the minimum value 0 of the gradation range to these product values, R' G', B' are obtained. Hence, the hue of the RGB pixel data is maintained the same before and after the correction. Further, since the values of the part expressions a through f are between 0 and 1, R', G', B' have values between 0 and 255, the final corrected RGB pixel data are confined within the gradation range.

Figure 12:
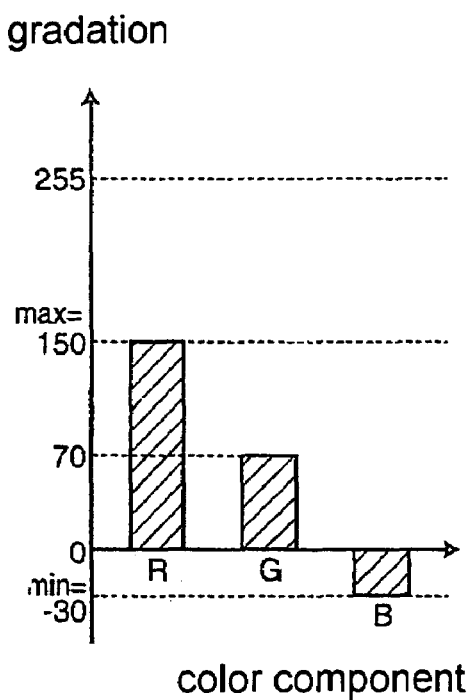
FIGS. 12a, and 12b are graphs explaining the Method 1 for correcting underflowing RGB pixel data to be confined within a gradation range 0~255, FIG. 12a showing the RGB pixel data before the correction, FIG. 12b showing the RGB pixel data after the correction.
Figure 12:
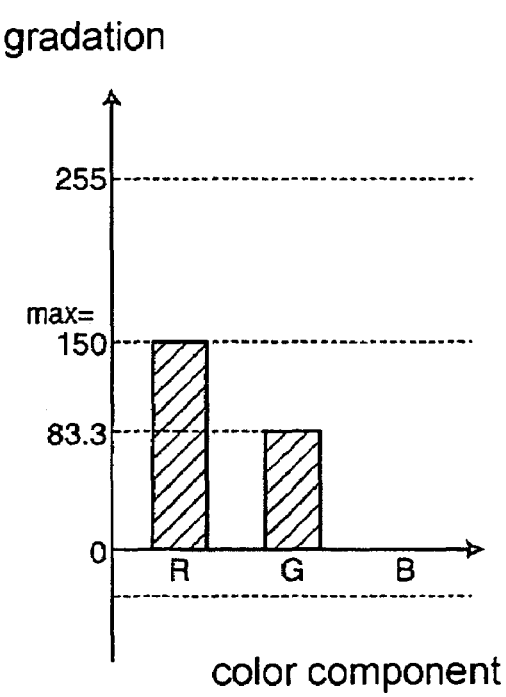

FIGS. 12a and 12b are graphs for explaining a case wherein RGB pixel data (underflowed RGB pixel data) having gradation values of respective components described as (150, 70, −30) are corrected by Method 1 to be confined within the gradation range of 0~255. FIG. 12a shows the RGB pixel data before the correction and FIG. 12b shows the RGB pixel data after the correction. In both of FIGS. 12a and 12b, the vertical axis and the horizontal axis represent the gradation value and the R, G, B color components, respectively. The RGB pixel data (150, 70, −30) before the correction are converted by Formula (4) into R'=150, G'=83.3, B'=0. Therefore, the ratio among the color difference values of the RGB pixel data is maintained the same before and after the correction as 1.0:0.56:0, which means the hue is maintained. Also, the underflowed B component is corrected to 0 which is the minimum value of the gradation range. This means that the correction to the gradation range has been achieved with minimum increase of the gradation range (increase of gradation descriptive range).

(Method 2)

Method 2 is a method for maintaining the hue and the luminance before and after the correction in the correction for causing the correction-subject RGB image data to be confined within the output gradation range. Specifically, a calculation of Formula (5) below is effected on overflowed RGB image data and a calculation of Formula (6) below is effected on underflowed RGB data, so that the RGB image data may be confined within the gradation range.

$$R' = MIN + \underbrace{\frac{R - min}{max - min}}_{\text{-g}} (255 - MIN)$$

$$G' = MIN + \underbrace{\frac{G - min}{max - min}}_{\text{-h}} (255 - min)$$

$$B' = MIN + \underbrace{\frac{B - min}{max - min}}_{\text{-i}} (255 - min)$$

$$MIN = 255 - \frac{(255 - d)(max - min)}{max - d}$$

formula (5)

$$R' = 0 + \underbrace{\frac{R - min}{max - min}}_{\text{-j}} (MAX - 0)$$

$$G' = 0 + \underbrace{\frac{G - min}{max - min}}_{\text{-k}} (MAX - 0)$$

$$B' = 0 + \underbrace{\frac{B - min}{max - min}}_{\text{-l}} (MAX - 0)$$

$$MAX = \frac{d(max - min)}{d - min}$$

formula (6)

where, min: the minimum value of a color component constituting the pixel data to be corrected, max: the maximum value of a color component constituting the pixel data to be corrected, R, G, B: gradation values of the respective color components before correction;

R', G', B': gradation values of the respective color components after correction; and D: an average value (=luminance value) of the R, G, B color components.

The part expressions g through i shown in the second terms of Formula (5) represent ratios of the respective color difference values relating to the maximum value thereof. MIN is an expression representing correction of the minimum value color component min to maintain the luminance value constant. In Formula (5), the difference value (255−MIN) between the maximum value 255 of the gradation range and MIN is multiplied by the ratios of the color component values of part expressions g-i and MIN is added to the respective resultant product values. Therefore, the RGB pixel data calculated by Formula (5) has the same unchanged hue as the RGB pixel data before the correction and also the same unchanged luminance. Further, since the values of these part expressions g through i are all between 0 and 1, the values of R', G', G' are all smaller than 255, so that the final RGB pixel data after the correction are confined within the possible gradation range.

Figure 13:
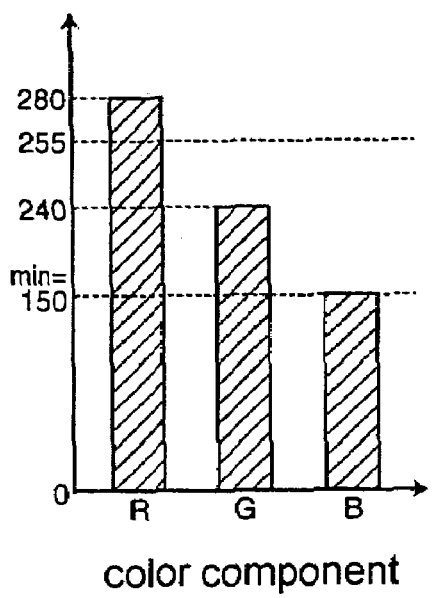
FIGS. 13a and 13b are graphs explaining Method 2 for correcting overflowing RGB pixel data to be confined within a gradation range, FIG. 13a showing the RGB pixel data before the correction, FIG. 13b showing the RGB pixel data after the correction.
Figure 13:
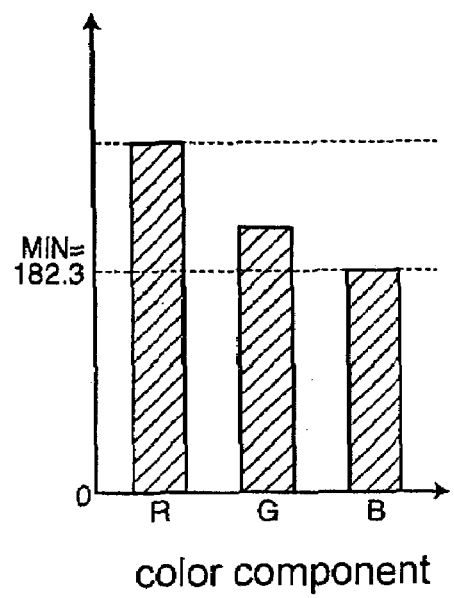

FIGS. 13a and 13b are graphs for explaining a case wherein the RGB pixel data (overflowed RGB pixel data) having gradation values of respective components described as (280, 240, 150) are corrected by Method 2 to be confined within the gradation range. FIG. 13a shows the RGB pixel data before the correction and FIG. 13b shows the RGB pixel data after the correction. Further, in these FIGS. 13a, 13b, the vertical axis represents the gradation value and the horizontal axis represents the R, G, B color components. The luminance value D of this pixel data is D=(280+240+150)/3=223.3. Further, since max=280 and min=150, there is obtained MIN=182.3. Therefore, by Formula (5), there is calculated RGB pixel data as (R', G', B')=(255, 232.5, 182.3). Since the luminance value of this RGB pixel data is (255+232.5+182.3)/3=223.3, it is understood that the luminance values is maintained the same before and after the correction. Further, since the color difference values are (72.7, 50.2, 0), the ratio among the color difference values relative to the maximum color difference value thereof (=72.7) is 1:0.69:0. This shows that the ratio among the color difference values is not changed before and after the correction, meaning that the hue is maintained the same. Also, the overflowed R component is corrected to 255 which is the maximum value of the gradation range. This means that the correction to the gradation range has been achieved with minimum reduction of the gradation range.

The part expressions j through l shown in the second terms of Formula (6) represent the ratios of the respective color difference values relative to the maximum value thereof. MAX represents an expression of correction on the maximum value color component max for maintaining the luminance value the same. In Formula (6), the difference value between the minimum value 0 of the gradation range and MAX is multiplied by the ratios of the color component values of part expressions i–l and MAX is added to the respective resultant product values. Therefore, the corrected RGB pixel data (R', G', B') has the same ratios of the color difference values relative to the maximum value thereof as the ratios of the RGB pixel data before the correction, meaning the hue being maintained the same. Further, since the values of these part expressions j through l are all between 0 and 1, the values of R', G', B' are all smaller than 255, so that the final RGB pixel data after the correction are confined within the possible gradation range.

Figure 14:
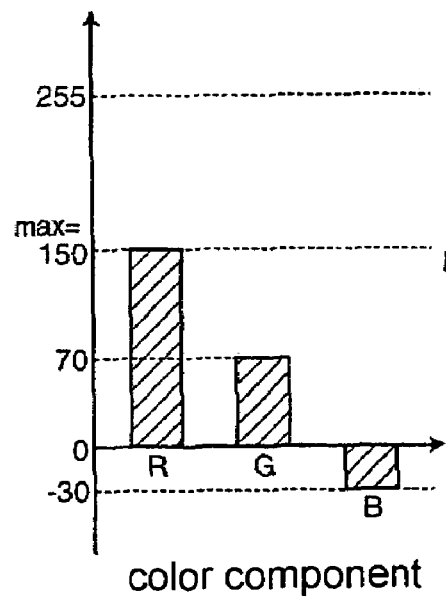
FIGS. 14a, and 14b are graphs explaining the Method 2 for correcting underflowing RGB pixel data to be confined within a gradation range, FIG. 14a showing the RGB pixel data before the correction, FIG. 14b showing the RGB pixel data after the correction.
Figure 14:
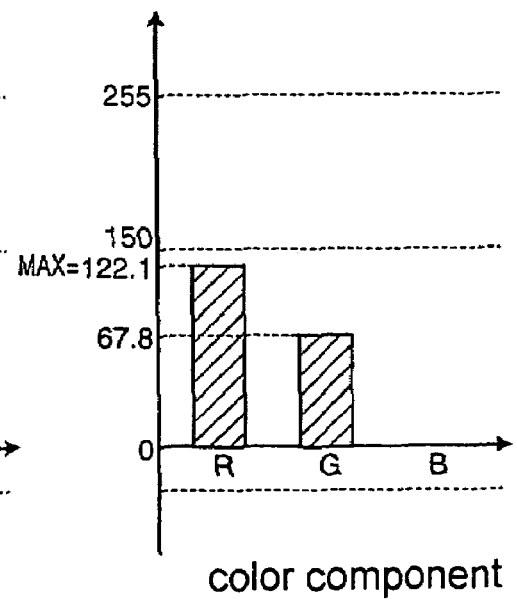

FIGS. 14a and 14b are graphs for explaining a case wherein the RGB pixel data (underflowed RGB pixel data) having gradation values of respective components described as (150, 70, −30) are corrected by Method 2 to be confined within the gradation range of 0~255. FIG. 14a shows the RGB pixel data before the correction and FIG. 14b shows the RGB pixel data after the correction. In both of FIGS. 14a and 14b, the vertical axis and the horizontal axis represent the gradation value and the R, G, B color components, respectively. The luminance value D of this pixel data is D=(150+70−30)/3=63.3. Further, since max=150 and min=−30, there is obtained MAX=122.1 Therefore, there is calculated RGB pixel data as (R', G', B')=(122.1, 67.8, 0). Since the luminance value of this RGB pixel data is (122.1+67.8+0)/3=63.3, it is understood that the luminance values is maintained the same before and after the correction. Further, the ratio among the color difference values is maintained the same before and after the correction as 1:0.56:0, meaning that the hue being maintained the same. Moreover the underflowed B component is corrected to 0 which is the minimum value of the gradation range. This means that the correction to the gradation range has been achieved with minimum increase of the gradation range (increase of gradation descriptive range).

As described above, according to the photographic processing apparatus of the invention, Method 1, i.e. Formula (3) is applied for correction of an overflowed RGB pixel data and Method 2, i.e. Formula (6) is applied for correction of an underflowed RGB pixel data. The reason for this will be described next.

Figure 15:
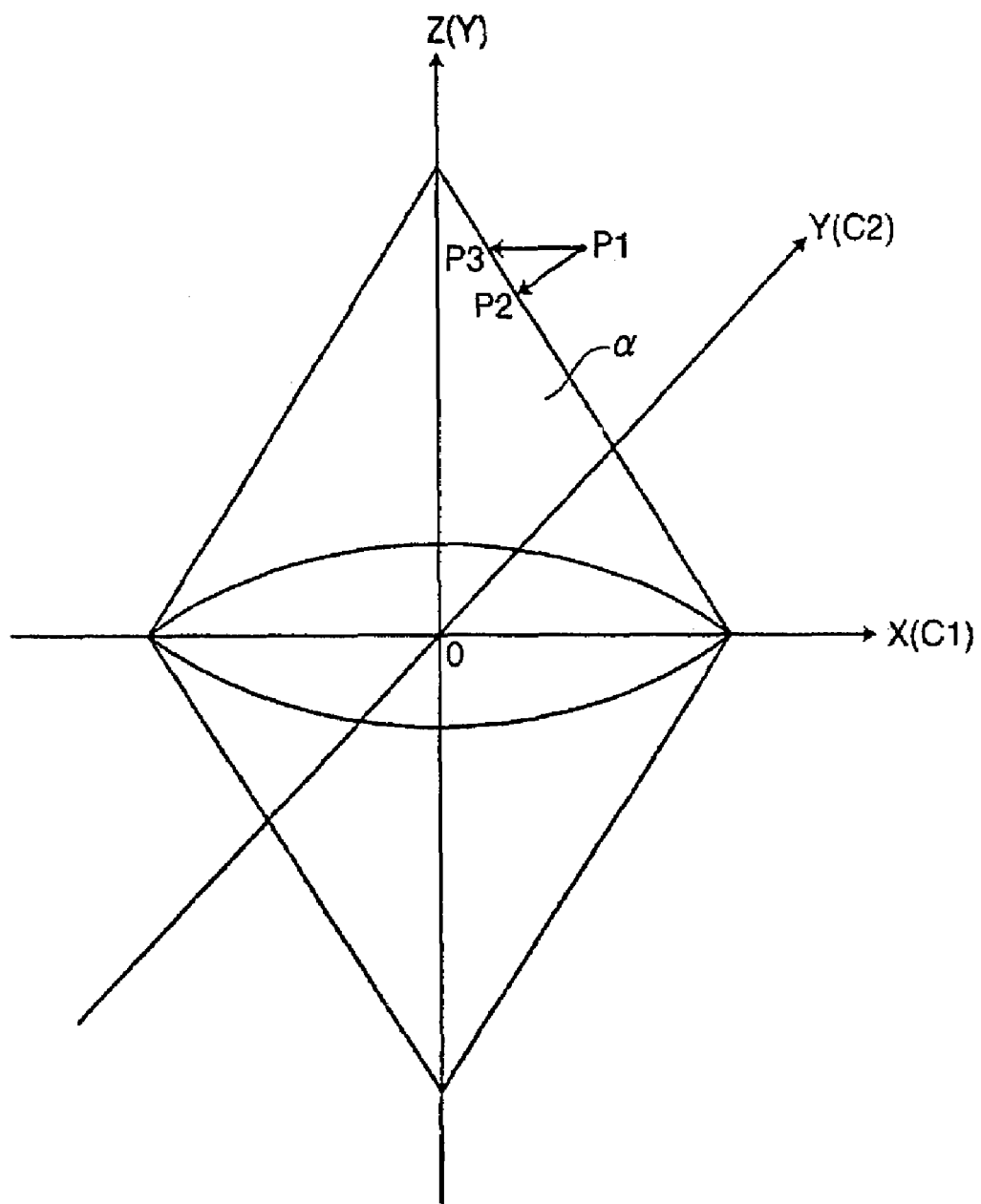
FIG. 15 is a graph showing the YCC color space for explaining the advantage of the use of Method 1 for the overflowing RGB pixel data, the X axis representing C1 component of the YCC pixel data, the Y axis representing C2 component of the YCC pixel data, the Z axis representing Y component of the YC pixel data.

FIG. 15 is a graph showing the YCC color space for explaining the advantage of the use of Method 1 for an overflowed RGB pixel data. In this figure, the X axis represents the C1 component of the YCC color space, the Y axis represents the C1 component of the YCC color space, and the Z axis represents the Y component of the YCC color space, respectively. This graph shows two conical areas α sharing a same bottom. If YCC pixel data present within this area α is converted into the RGB pixel data, this converted RGB pixel data will be confined within the gradation range. On the other hand, if YCC pixel data out of the area α is converted into the RGB pixel data, this converted RGB pixel data will be out of the gradation range. Further, if YCC pixel data located outside the area α and inside the positive quadrants of the Z axis is converted into RGB pixel data, this RGB pixel data will overflow from the gradation range. If YCC pixel data located outside the area α and within the negative quadrants of the Z axis is converted into RGB pixel data, this RGB pixel data will underflow from the gradation range.

As described above, if the YCC pixel data located outside the area α is converted into RGB pixel data, this RGB pixel data will overflow from the gradation range. Then, if this RGB pixel data is corrected by Method 1 to be confined within the gradation range, when this correction is described in the YCC color space, the data is corrected to a position P2 within the area α, since the luminance value thereof is reduced by the correction. On the other hand, in the case of Method 2, the data is corrected to a position P3 with no change in its Z value, since the hue and the luminance value thereof are maintained the same before and after this correction. The magnitude of vector P1→P2 represents the amount of chroma reduction. And, this vector P1→P2 is smaller in magnitude than the vector P1→P3. Therefore, the amount of chroma reduction resulting from the correction of the RGB pixel data by Method 1 is smaller than that resulting from the correction by Method 2. Chroma reduction in pixel data in a high gradation range (meaning the values of R, G, B being near 255) tends to invite significant deterioration in the image quality. Hence, it is desired to minimize the amount of chroma reduction. For this reason, the photographic processing apparatus of the invention applies Method 1 for correction of an overflowed RGB pixel data.

Next, with reference to FIGS. 12a, 12b and 14a, 14b, there will be described the reason why the correction by Method 2 is preferred for correction of an underflowed RGB pixel data. As may be understood from comparison between FIG. 12b and FIG. 14b, compared with the correction by Method 1, the luminance value of the RGB pixel data for correction will be smaller with the correction by Method 2. The underflowed RGB pixel data represent an image in the low gradation range (meaning the values of R, G, B being near 0, so that it is difficult to describe the density differences as they are). Hence, in order to improve the reproducibility of the image, it is preferred that such correction for making density differences distinct be made. To this end, the underflowed RGB pixel data should be corrected to be confined within the gradation range with minimizing increase in the luminance value thereof. For this reason, the photographic processing apparatus of the invention applies Method 2 for correction of the underflowed RGB pixel data, which Method 2 results in less increase in the luminance value than Method 1, thereby to improve the color reproducibility in the low gradation range.

Figure 16:
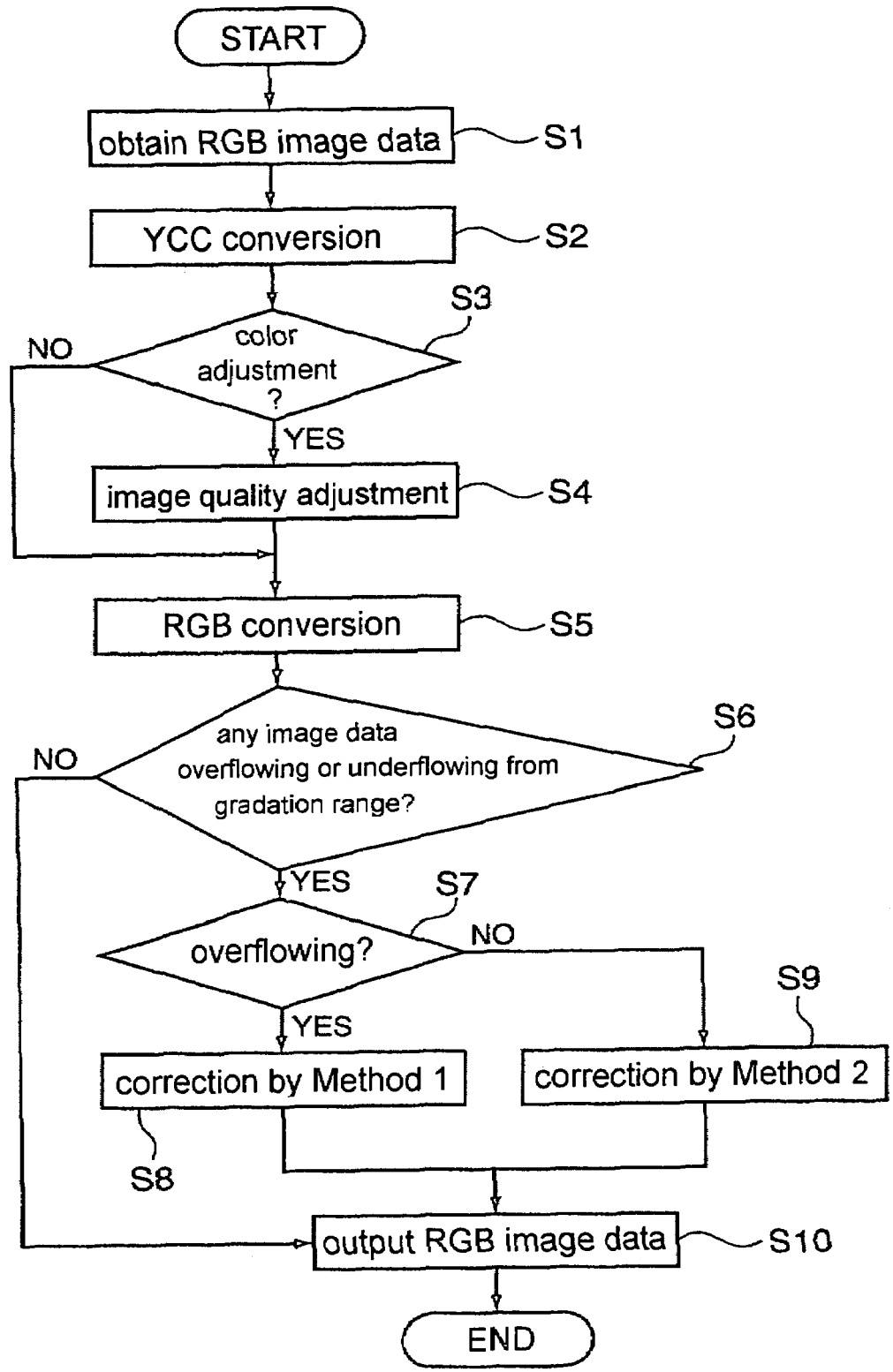
FIG. 16 is a flowchart illustrating the series of processing steps effected by the image processing section.

FIG. 16 is a flowchart showing the series of processing steps effected by the image processing unit 20.

First, when an image recorded in a photographic film is to be printed, the image recorded in the film is read by the film scanner 10 and then converted by the A/D converter 138 into digital image data and stored as such in the image memory 139.

On the other hand, when digital image data is to be printed, the digital image data recorded in a recording medium is read by the recording medium driver 140 and stored in the image memory 139. And, with one of the processes described above, RGB image data is obtained (step S1).

The RGB image data stored in the image memory 139 is read by the YCC conversion section 24 and converted into YCC image data (step S2). This YCC image data is temporarily stored in a RAM.

Figure 17:
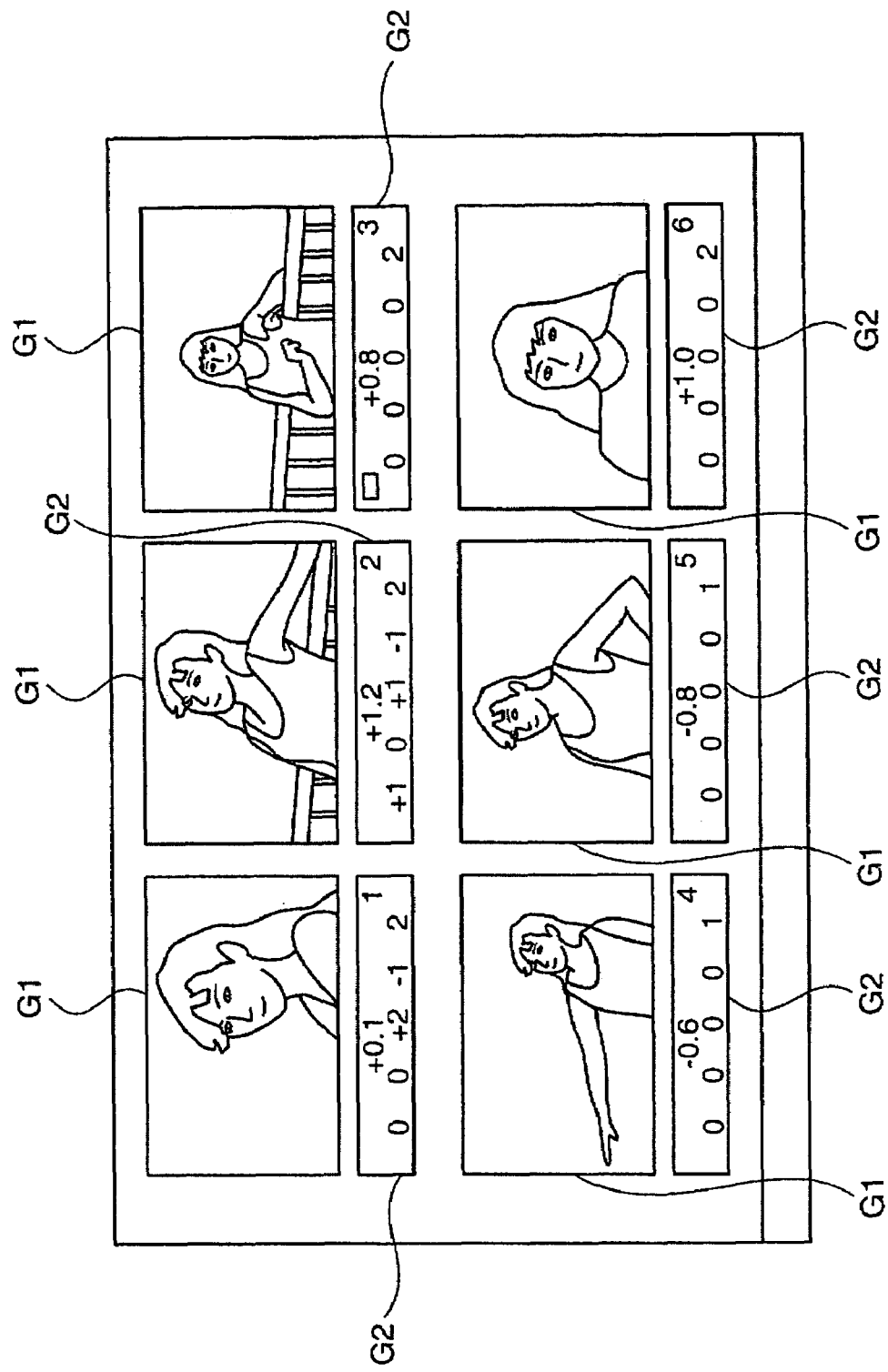
FIG. 17 is a view of a display screen showing simulated images to be displayed on a display section when an operator is to effect image quality adjustment thereon.
Figure 18:
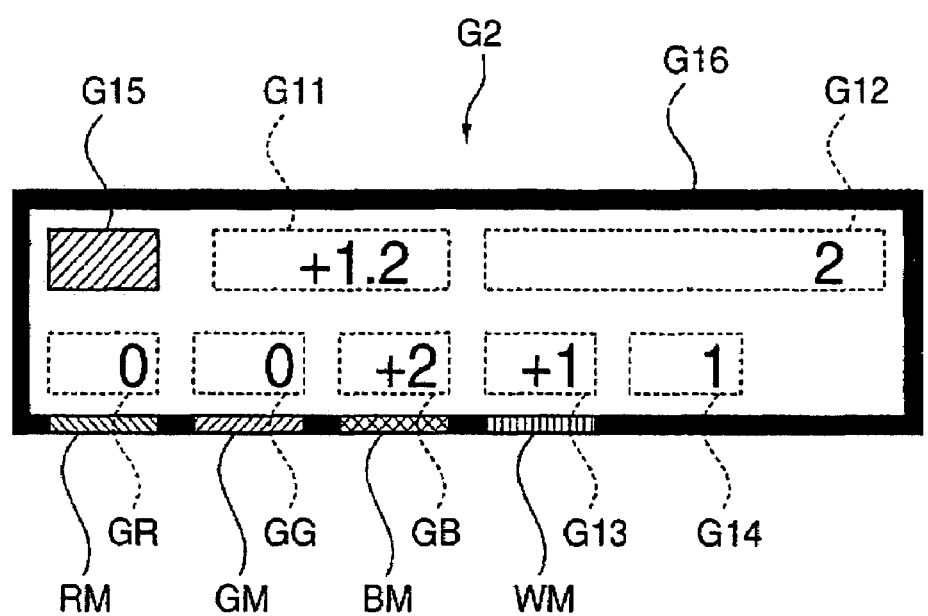
FIG. 18 is a view of a display screen showing a display screen displaying adjustment values.

Next, upon receipt of an operator's operation instruction via the operation section 70 (meaning YES at step S3), the image quality adjustment section 25 effects image quality adjustment according to the operation instruction on the YCC image data (step S4). FIG. 17 shows a simulation screen showing simulated images to be displayed on the display section 80 when an operator is to effect image quality adjustment. This simulation screen shows simulated images G1 in a predetermined number of frames which images simulate images to be eventually formed on the print paper roll 31 by exposure thereof with the RGB image data. In FIG. 17, the simulated images G1 are shown in 2 rows and 3 columns. Further, downwardly of the simulated images G1, there are shown adjustment value display screens G2 showing image quality adjustment amounts for the respective simulated images G1. FIG. 18 is a view showing the adjustment value displaying screen G2 in details. This adjustment value display screen G2 includes adjustment value display boxes GR, GG, GB displaying adjustment values inputted from the operation section 70, a density adjustment value display box G13 for displaying an adjustment value inputted from the operation section 70 respecting an average increase/decrease in the exposure amount corresponding to density variation in the photograph, and a print number display box G14 for displaying the number of prints to be made from each frame image inputted from the operation section 70. Further, in the lower side of an outer frame G16 of the correction value displaying screen, there are shown guide marks RM, GM, WM for the colors of R, G, B, W (white). Also, at a left-upper portion in the adjustment value display screen G2, there is shown a cursor G15 indicating the corresponding simulated image G1 being currently selected as target for operation by the operation section 70.

Incidentally, each time the operator effects an image quality adjustment in the YCC color space, the simulated image G1 is updated with resultant conversion of the image-quality adjusted YCC image data into RGB image data by the RGB conversion section 26. Also, in this simulation screen shown, the simulated images G1 are shown in 2 rows and 3 columns; With different setting, however, the number of the frames of the simulated images G1 to be displayed at one time can be changed. Moreover, it is also possible to select a plurality of desired simulated images G1 from the simulated images G1 shown at one time and then to effect image quality adjustment on these selected simulated images G1 at one time.

If no image quality adjustment is to be made at step S3 (meaning NO at step S3), the process skips step S4 and jumps to step S5.

The YCC image data is converted into RGB image data by the RGB conversion section 26 (step S5) and then the judging section 21a judges presence/absence of any RGB pixel data which has overflowed or underflowed from the gradation range as the result of this conversion into the RGB image data (step S6). If such RGB pixel data out of the gradation range is present (meaning YES at step S6), the process goes to step S7. Conversely, if no such RGB pixel data out of the gradation range is present (meaning NO at step S6), the process goes to step S10.

At step S7, the process judges whether the pixel data out of the gradation range has overflowed or underflowed from the gradation range of 0~255. If the RGB pixel data has overflowed (meaning YES at step S7), the image quality adjustment section 25 corrects this RGB pixel data by Method 1 to be confined within the gradation range (step S8). Conversely, if the RGB pixel data has underflowed (meaning NO at step S7), the image quality adjustment section 25 corrects this RGB pixel data by Method 2 to be confined within the gradation range (step S9).

With this corrected RGB pixel data, the RGB image data is updated and this updated RGB image data is eventually outputted to the exposure control section 34 and the display section 80 (step S10).

As described above, according to this second embodiment, any pixel data which has overflowed or underflowed from the gradation range as the result of conversion of YCC image data adjusted in the YCC color space into the RGB color space is corrected by Method 1 or Method 2 to be confined within the gradation range. Therefore, the hue of the pixel data subjected to correction can be maintained the same before and after the correction. Furthermore, since an overflowed RGB pixel data is corrected by using Method 1, resultant chroma reduction can be restricted. In addition, since an underflowed RGB pixel data is corrected by using Method 2, this RGB pixel data can be corrected within the gradation range with maintaining high density of the data.

Incidentally, in the above, there has been described only the case where one color component alone of the color components of the RGB pixel data has overflowed or underflowed from the gradation range. However, the invention is not limited to this construction. The photographic processing apparatus and method of the invention can be adapted for correcting RGB pixel data to be confined with the gradation range with keeping the hue unchanged also in other cases of e.g. when two of the color components R, G, B have deviated from the gradation range.

Further, in the above discussion, the correction of an overflowed RGB pixel data is effected by using Method 1 and the correction of an underflowed RGB pixel data is effected by using Method 2. The invention is not limited to such construction. Instead, the RGB pixel data can be corrected by using Method 1 alone or Method 2 alone.

Incidentally, the image processing operations described in the above embodiments can be realized in the form of a computer program. And, this computer program will be stored in a computer-readable storage medium. In the case of the present invention, this storage medium can be an semiconductor memory (e.g. ROM per se) required for the process, but not illustrated as it is executed at the image processing section 20. Or, though not shown, it can be a program recording medium to be inserted into a program reader device as an external storage unit so that its program may be loaded into the device upon the insertion.

In any of the cases above, it is possible to adapt the stored program to be executable when accessed by a microprocessor (not shown). Or, it is also possible to adapt the program to be executed when this program is read from the medium and then this read program is downloaded to an unillustrated program storing area of the microprocessor. In this case, a program required for the downloading operation will be stored in advance in the main body of the device.

In the above, the program medium described above refers to a recording medium detachable to a main device body and this medium can fixedly storing the program therein, such as the tape type media as a magnetic tape or cassette tape, a disc type media such as magnetic discs including a floppy (registered trademark) disc, a hard disc, etc, as well as optical discs including CD-ROM, MO, MD, DVD, etc, the card type media such as IC card (including a memory card) or an optical card, or the semiconductor memory devices including a mask ROM, EPROM, EEPROM, flash ROM, etc.

Lastly, the present invention is not limited by the above-described embodiments, but can be subjected to various changes or modifications within the scope of the invention defined in the appended claims.

The invention claimed is:

1. An image processing method for correcting pixel values of each pixel constituting color image data by shifting, in a coordinate system, a mathematical correction function defining correction values for input values, the method comprising the computer-implemented steps of:

determining a maximum value and a minimum value among correction values (b, g, r) of respective color components obtained for each pixel by using said correction function, calculating differences ($\Delta b$, $\Delta g$, $\Delta r$) between the respective correction values of the respective color components and said minimum value, and calculating a difference (DR) between said maximum value and said minimum value;

dividing said calculated differences ($\Delta b$, $\Delta g$, $\Delta r$) between the respective correction values of the respective color components and said minimum value by said calculated difference (DR) between said maximum value and said minimum value, thereby to obtain color ratios (Cb, Cg, Cr) for the respective color components;

determining, as an inappropriate pixel, any pixel having a correction value overflowing from a predetermined maximum output gradation value and setting said overflowing correction value to said predetermined maximum output gradation value and determining, as an inappropriate pixel, any pixel having a correction value underflowing from a predetermined minimum output gradation value and setting said underflowing correction value to said predetermined minimum output gradation value; and controlling color balance adjustment so as to cause the correction values of said inappropriate pixel to agree with said respective color ratio thereof.

2. The image processing method of claim 1, wherein the step of controlling utilizes sums of said minimum value and respective product values obtained by multiplying a difference between the maximum output gradation value and the minimum value by the color ratios as the respective final pixel values if the correction value of at least one color component overflows from the maximum output gradation value.

3. The image processing method of claim 1, wherein the step of controlling utilizes the product value obtained by multiplying the maximum value by its color ratio as its final pixel value, if the correction value of at least one color component underflow from the minimum output gradation value.

4. An image processing apparatus for correcting pixel values of each pixel constituting color image data by shifting, in a coordinate system, a mathematical correction function defining correction values for respective input values, the apparatus comprising a color balance adjustment section for adjusting color balance of the corrected image data, the color balance adjustment section comprising:

a calculating section for determining a maximum value and a minimum value among correction values (b, g, r) of respective color components obtained for each pixel by using said correction function, calculating difference (Δb, Δg, Δr) between the respective correction values of the respective color components and said minimum value, calculating a difference (DR) between said maximum value and said minimum value, and dividing said calculated differences (Δb, Δg, Δr) between the correction values of the respective color components and said minimum value by said calculated difference (DR) between said maximum value and said minimum value, thereby to obtain color ratios (Cb, Cg, Cr) for the respective color components;

a judging section for determining as an inappropriate pixel, any pixel having a correction value overflowing from a predetermined maximum output gradation value and setting said overflowing correction value to said predetermined maximum output gradation value, and determining as an inappropriate pixel, any pixel having a correction value underflowing from a predetermined minimum output gradation value and setting said underflowing correction value to said predetermined minimum output gradation value; and a gradation value determining section for controlling color balance adjustment so as to cause the correction values of said inappropriate pixel to agree with said respective color ratio thereof.

5. A computer-readable medium having stored thereon computer executable instructions, which when executed performs the steps of:

determining a maximum value and a minimum value among correction values (b, g, r) of respective color components obtained for each pixel by using said correction function, calculating differences (Δb, Δg, Δr) between the respective correction values of the respective color components and said minimum value, and calculating a difference (DR) between said maximum value and said minimum value;

dividing said calculated differences (Δb, Δg, Δ) between the respective correction values of the respective color components and said minimum value by said calculated difference (DR) between said maximum value and said minimum value, thereby to obtain color ratios (Cb, Cg, Cr) for the respective color components;

determining, as an inappropriate pixel, any pixel having a correction value overflowing from a predetermined maximum output gradation value and setting said overflowing correction value to said predetermined maximum output gradation value, and determining, as an inappropriate pixel, any pixel having a correction value underflowing from a predetermined minimum output gradation value and setting said underflowing correction value to said predetermined minimum output gradation value; and controlling color balance adjustment so as to cause the correction values of said inappropriate pixel to agree with said respective color ratio thereof.

6. An image processing apparatus for outputting image data consisting of a plurality of image data described in the RGB color system in a predetermined gradation range, the apparatus comprising:

a conversion section for converting the image data in the RGB color system into a different color system for image quality adjustment to provide converted image data;

an image quality adjustment section for adjusting image quality of the converted image, data;

a reverse conversion section for reverse converting the image quality adjusted image data back into the ROB color system to provide a reverse-converted image data;

a judging section for determining whether pixel values of each pixel constituting the reverse-converted image data are confined within said predetermined gradation range; and a color balance adjustment section for performing a predetermined calculation on pixel values of the respective color components included in each pixel determined as being out of said predetermined gradation range by the judging section, thereby to cause the pixel values thereof to be confined within said predetermined gradation range, and adjusting said pixel values of said each pixel to fixedly maintain a ratio among the pixel values of the respective color components based on the minimum value among said pixel values.

7. The image processing apparatus of claim 6, wherein the color balance adjustment section is operable to fixedly maintain an average value of the pixel value of each color component contained in the pixel prior to the adjustment.

8. The image processing apparatus of claim 6, wherein the judging section is operable to determine a maximum pixel value contained in the pixel as overflowing from the predetermined gradation range; and wherein the color balance adjustment section is operable to cause the maximum pixel value to agree with the maximum value of the predetermined gradation range.

9. The image processing apparatus of claim 6, wherein the judging section is operable to determine a minimum pixel value contained in the pixel as underflowing from the predetermined gradation range; and wherein the color balance adjustment section is operable to cause the minimum pixel value to agree with the minimum value of the predetermined gradation range.

10. The image processing apparatus of claim 6, wherein the color balance adjustment section is operable to maintain the ratio and/or the average value of the pixel value of the pixel for adjustment.

\* \* \* \* \*